US012589784B2

(12) United States Patent
Sapp et al.

(10) Patent No.: US 12,589,784 B2
(45) Date of Patent: Mar. 31, 2026

(54) SYSTEM AND METHOD FOR A VIRTUAL APPROACH SIGNAL

(71) Applicant: BNSF Railway Company, Fort Worth, TX (US)

(72) Inventors: Scott D. Sapp, Smithville, MO (US); Mitchell W. Beard, Shawnee, KS (US); Michael E. Ramolt, Shawnee, KS (US)

(73) Assignee: BNSF Railway Company, Fort Worth, TX (US)

( * ) Notice: Subject to any disclaimer, the term of this patent is extended or adjusted under 35 U.S.C. 154(b) by 0 days.

(21) Appl. No.: 18/160,713

(22) Filed: Jan. 27, 2023

(65) Prior Publication Data

US 2024/0253677 A1     Aug. 1, 2024

(51) Int. Cl.
B61L 23/00       (2006.01)
B60T 13/66       (2006.01)
B61L 27/00       (2022.01)

(52) U.S. Cl.
CPC ............ B61L 23/00 (2013.01); B60T 13/665 (2013.01); B61L 27/00 (2013.01); *B61L 2205/00* (2013.01)

(58) Field of Classification Search
CPC ...... B61L 23/00; B61L 27/00; B61L 2205/00; B61L 3/00; B61L 2201/00; B60T 13/665
See application file for complete search history.

(56) References Cited

U.S. PATENT DOCUMENTS 8,340,056 B2    12/2012  Siriwongpairat et al.
9,102,341 B2     8/2015  Malone et al.

9,150,229 B2    10/2015  Steffen et al.
9,340,220 B2     5/2016  Fries et al.
9,711,046 B2     7/2017  Shubs, Jr.
10,086,857 B2   10/2018  Puttagunta et al.
2013/0334373 A1* 12/2013  Malone, Jr. ........... B61L 23/166
                                                246/2 R (Continued)

OTHER PUBLICATIONS

Dick, Relative Capacity and Performance of Fixed- and Moving-Block Control Systems on North American Freight Railway Lines and Shared Passenger Corridors, Dec. 31, 2019.

(Continued)

*Primary Examiner* — Kyle J Kingsland

(74) *Attorney, Agent, or Firm* — Whitaker Chalk Swindle & Schwartz PLLC; Enrique Sanchez, Jr.

(57)          ABSTRACT

A system and method for providing virtual approach signaling between physical signaling components. The system and method can generate virtual approach signal indicators to increase an efficiency along a segment of track. The system can provide a signal for the locomotive to increase the speed at which the locomotive can travel along the segment of track based on the virtual approach signal indicators, rather than physical signal components. The system can provide enhanced safety along the segment of track by automating the virtual approach signal indicators for the locomotive. The system and method can provide a reduced cost through the efficiency gains along the railway by upgrading the virtual approach signal to an all-clear indication removing any speed restrictions previously binding the locomotive. The system and method can provide a modular signaling ability to enhance a capacity along the segment of track.

27 Claims, 18 Drawing Sheets

(56) References Cited

U.S. PATENT DOCUMENTS

| | | | | |
|---|---|---|---|---|
| 2015/0060608 A1* | 3/2015 | Carlson | ................. | B61L 25/021 |
| | | | | 246/122 R |
| 2018/0015937 A1* | 1/2018 | Woo | .......................... | B61L 3/10 |
| 2018/0319413 A1* | 11/2018 | Specht | .................... | B61L 21/10 |
| 2019/0071102 A1 | 3/2019 | Sheehan et al. | | |
| 2019/0168788 A1 | 6/2019 | Ghaly | | |
| 2019/0263432 A1 | 8/2019 | Carlson et al. | | |
| 2020/0207384 A1* | 7/2020 | Dick | ....................... | B61L 23/14 |
| 2021/0107540 A1 | 4/2021 | Lucas | | |
| 2021/0206407 A1* | 7/2021 | Carlson | ................... | B61L 27/20 |
| 2024/0149929 A1* | 5/2024 | Zwolinski | .............. | B61L 27/40 |

OTHER PUBLICATIONS

Lilee Systems, Scalable and Reliable Communications Infrastructure For Positive Train Control (PTC), Jun. 30, 2020.

* cited by examiner

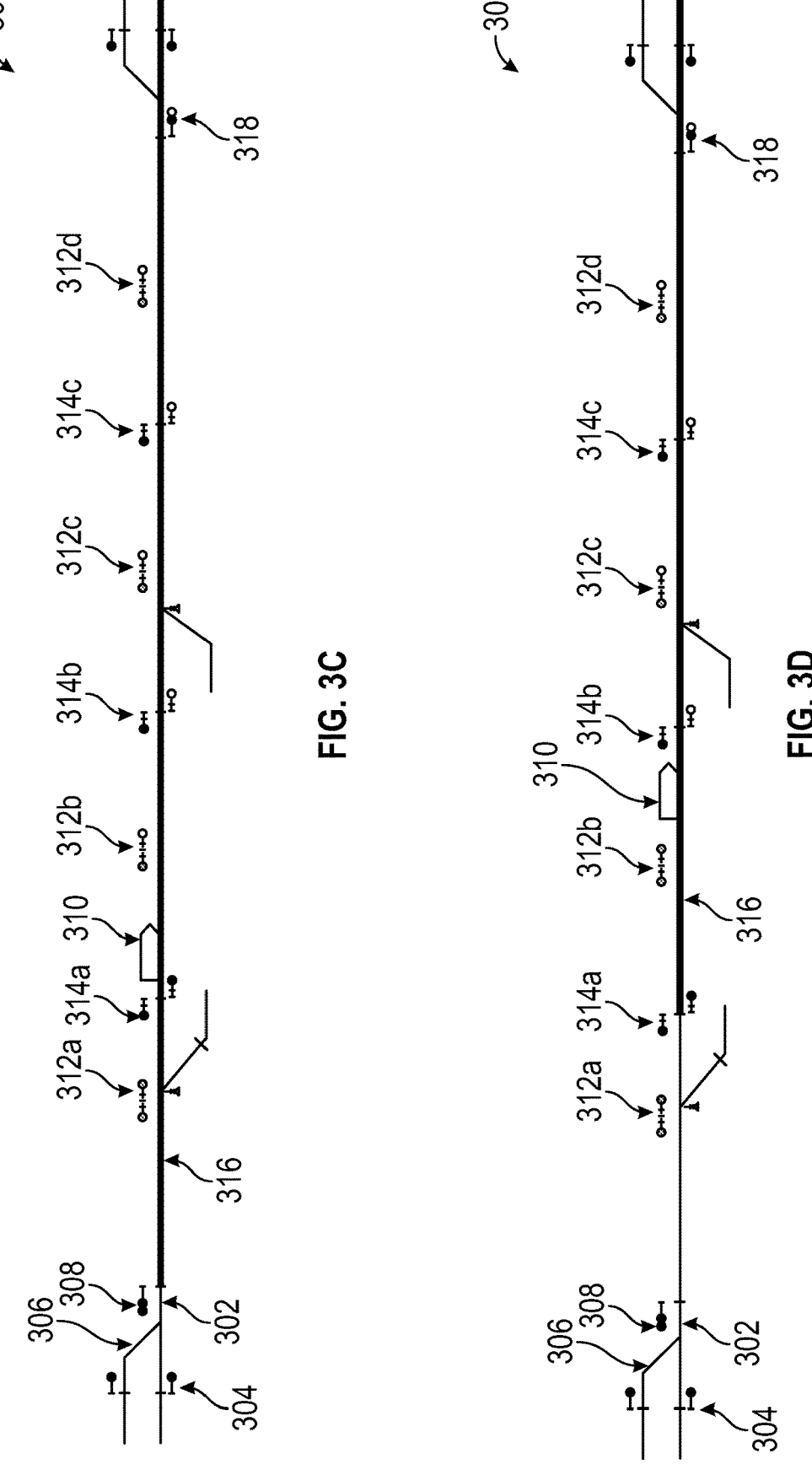

500

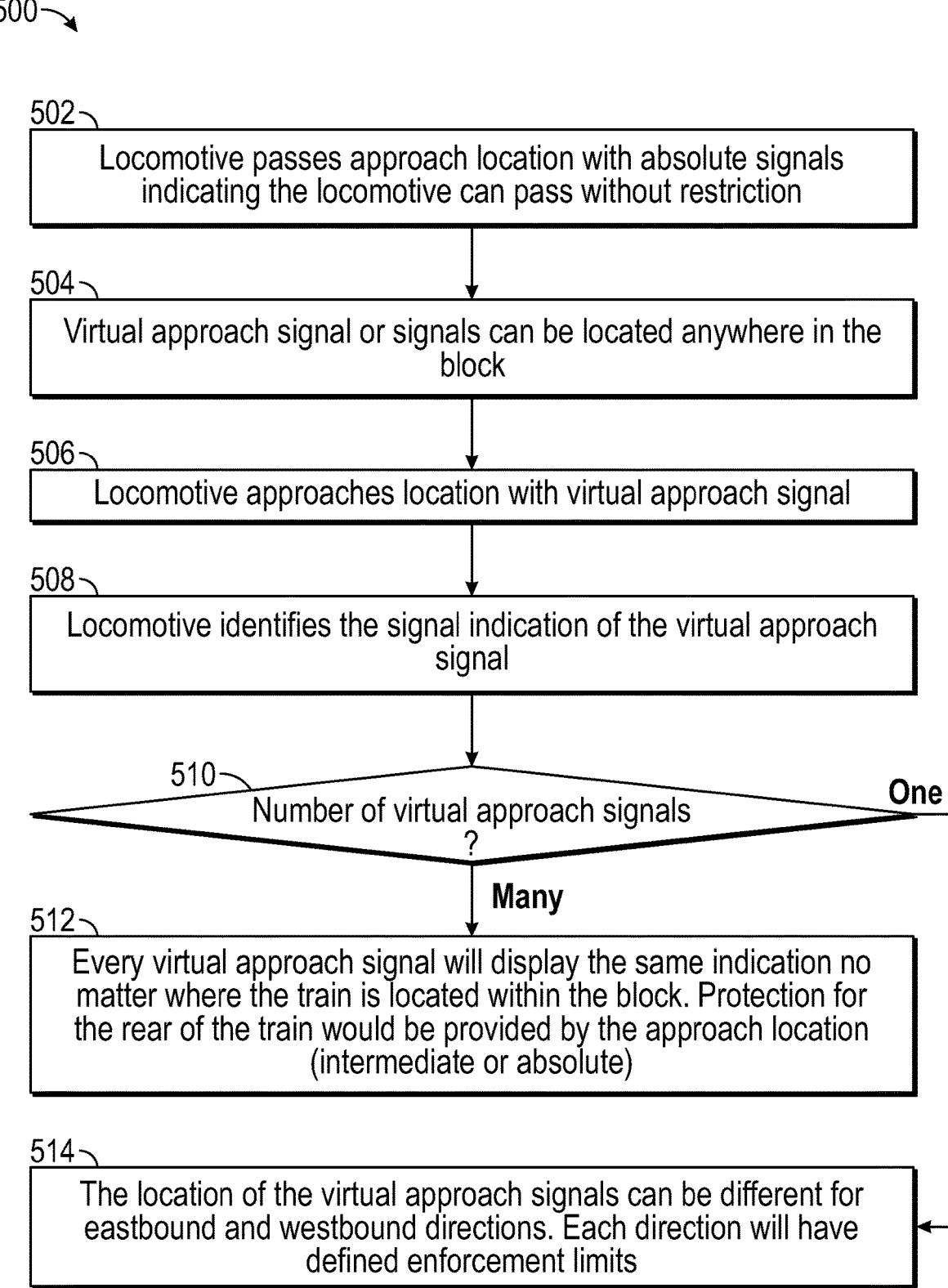

502

Locomotive passes approach location with absolute signals indicating the locomotive can pass without restriction

504

Virtual approach signal or signals can be located anywhere in the block

506

Locomotive approaches location with virtual approach signal

508

Locomotive identifies the signal indication of the virtual approach signal

510

Number of virtual approach signals ?

One

Many

512

Every virtual approach signal will display the same indication no matter where the train is located within the block. Protection for the rear of the train would be provided by the approach location (intermediate or absolute)

514

The location of the virtual approach signals can be different for eastbound and westbound directions. Each direction will have defined enforcement limits

FIG. 5

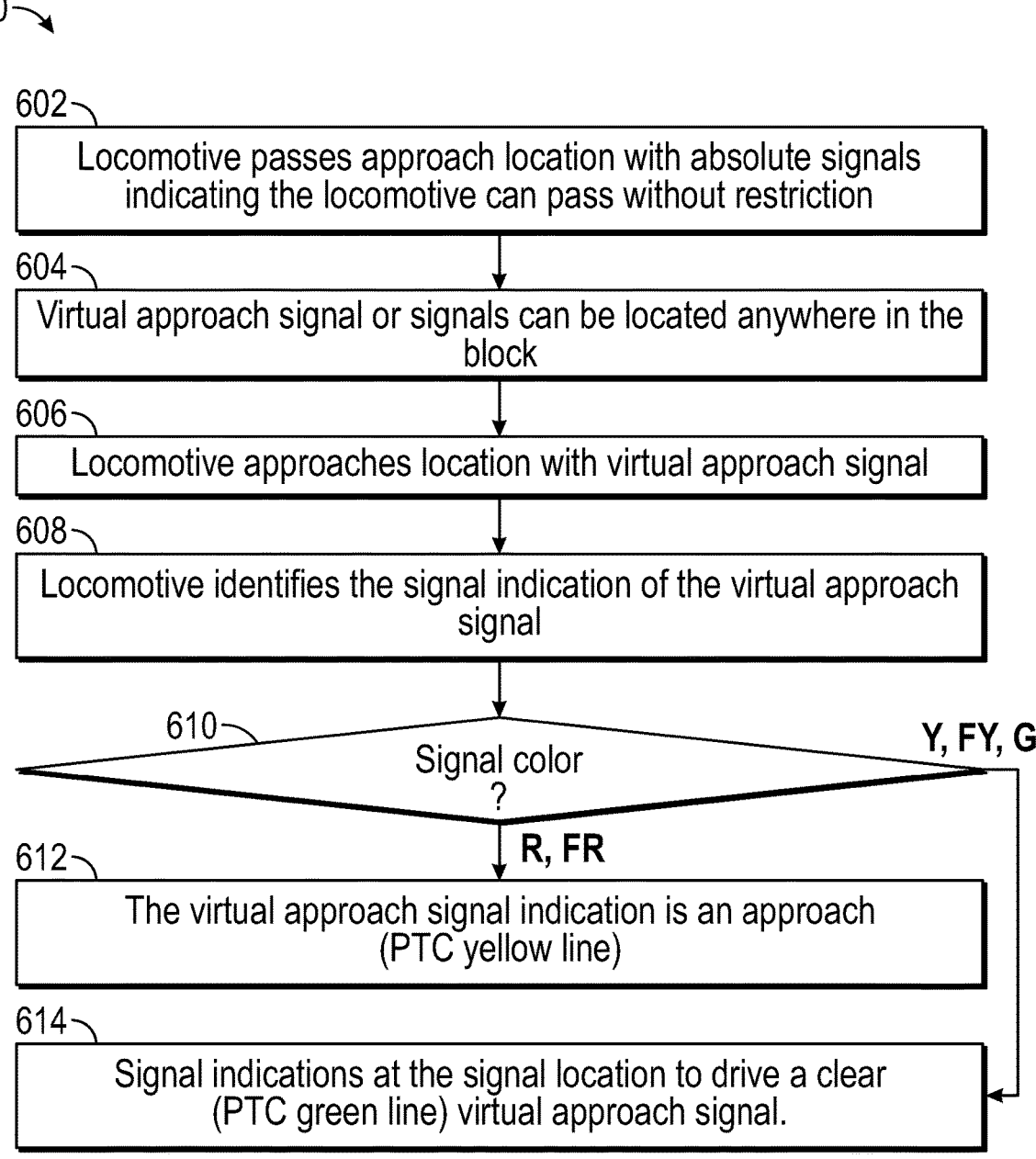

600

602
Locomotive passes approach location with absolute signals indicating the locomotive can pass without restriction 604
Virtual approach signal or signals can be located anywhere in the block 606
Locomotive approaches location with virtual approach signal 608
Locomotive identifies the signal indication of the virtual approach signal 610
Signal color ?

Y, FY, G

R, FR

612
The virtual approach signal indication is an approach (PTC yellow line)

614
Signal indications at the signal location to drive a clear (PTC green line) virtual approach signal.

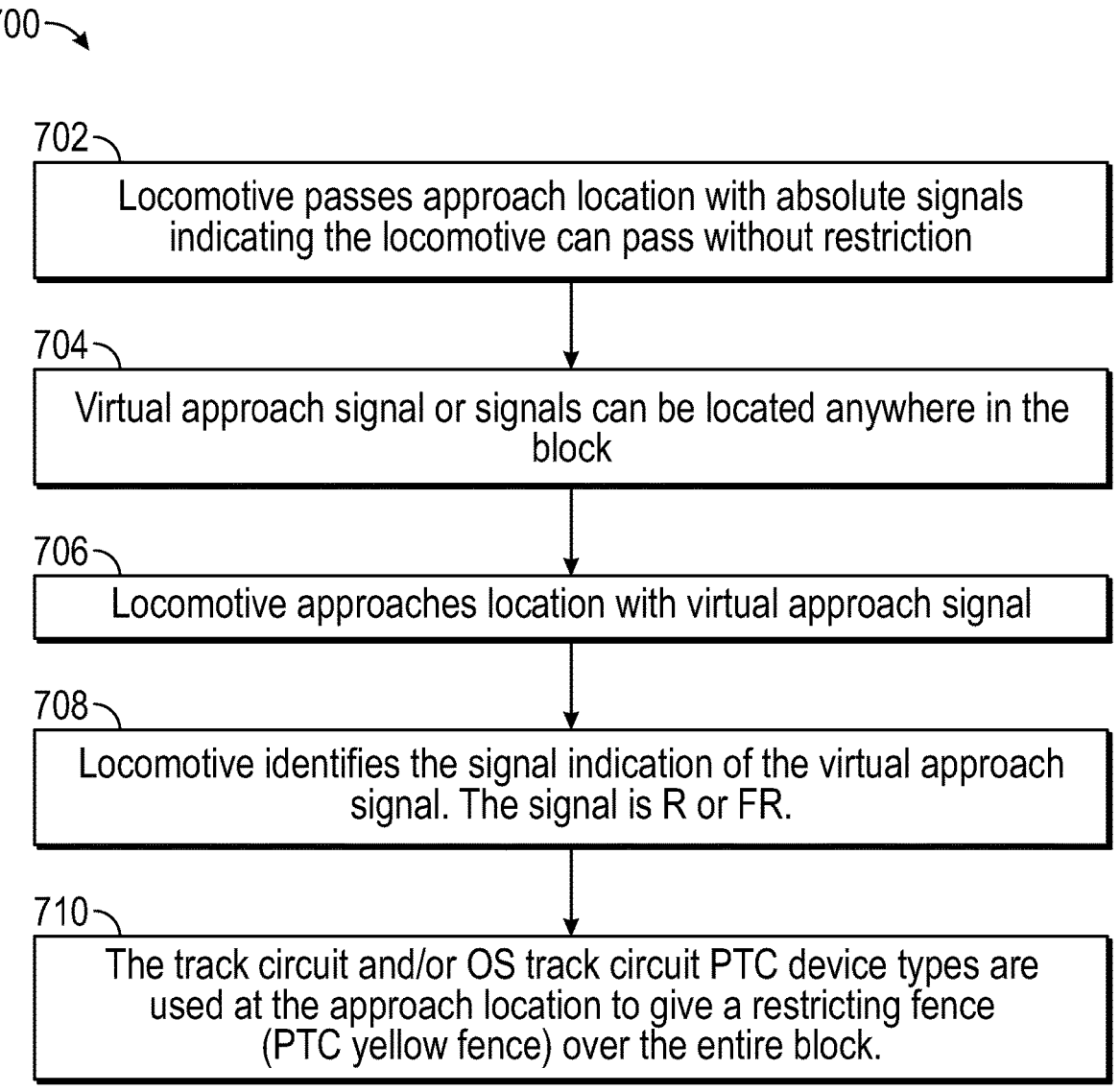

702

Locomotive passes approach location with absolute signals indicating the locomotive can pass without restriction

704

Virtual approach signal or signals can be located anywhere in the block

706

Locomotive approaches location with virtual approach signal

708

Locomotive identifies the signal indication of the virtual approach signal. The signal is R or FR.

710

The track circuit and/or OS track circuit PTC device types are used at the approach location to give a restricting fence (PTC yellow fence) over the entire block.

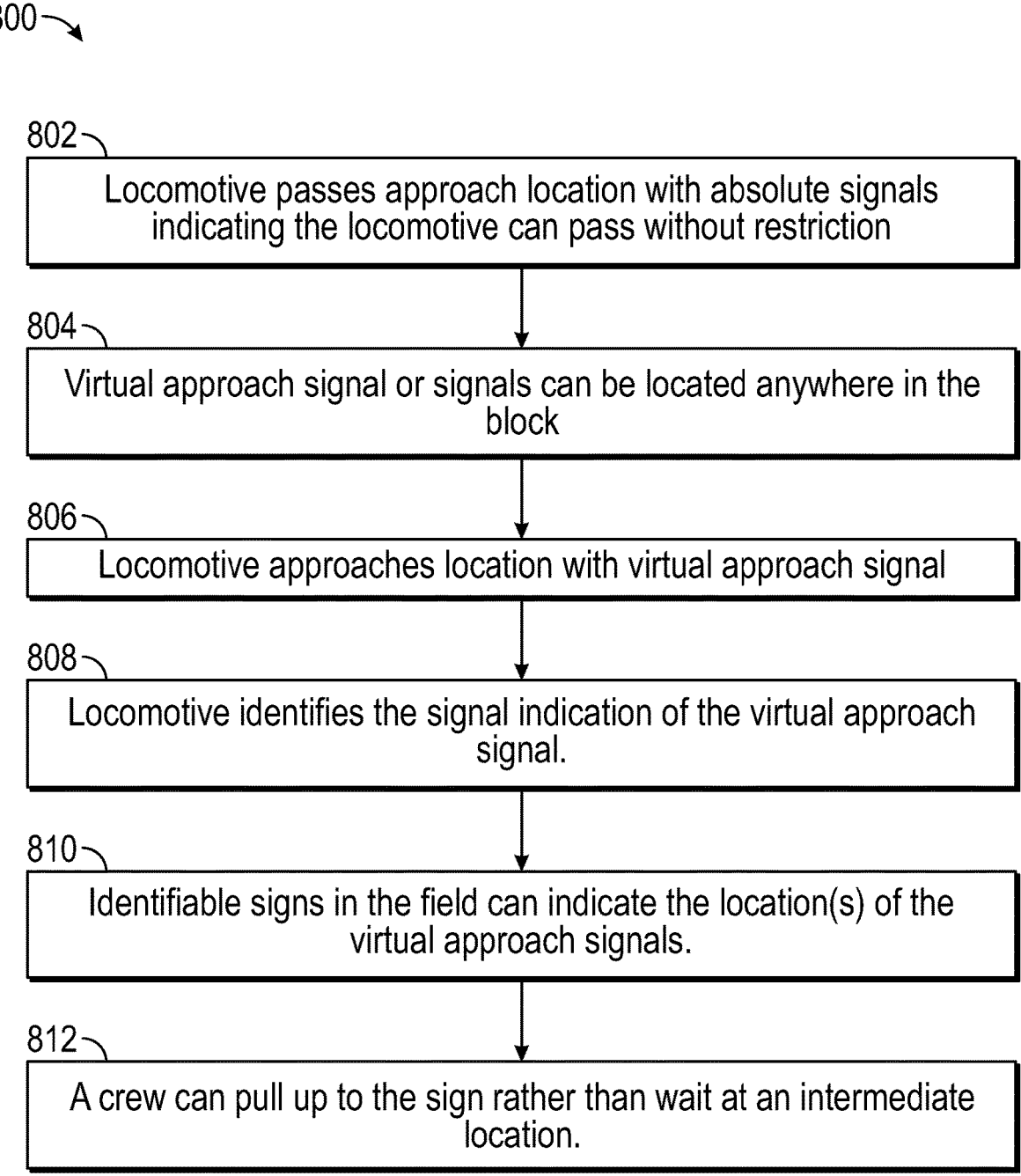

802

Locomotive passes approach location with absolute signals indicating the locomotive can pass without restriction

804

Virtual approach signal or signals can be located anywhere in the block

806

Locomotive approaches location with virtual approach signal

808

Locomotive identifies the signal indication of the virtual approach signal.

810

Identifiable signs in the field can indicate the location(s) of the virtual approach signals.

812

A crew can pull up to the sign rather than wait at an intermediate location.

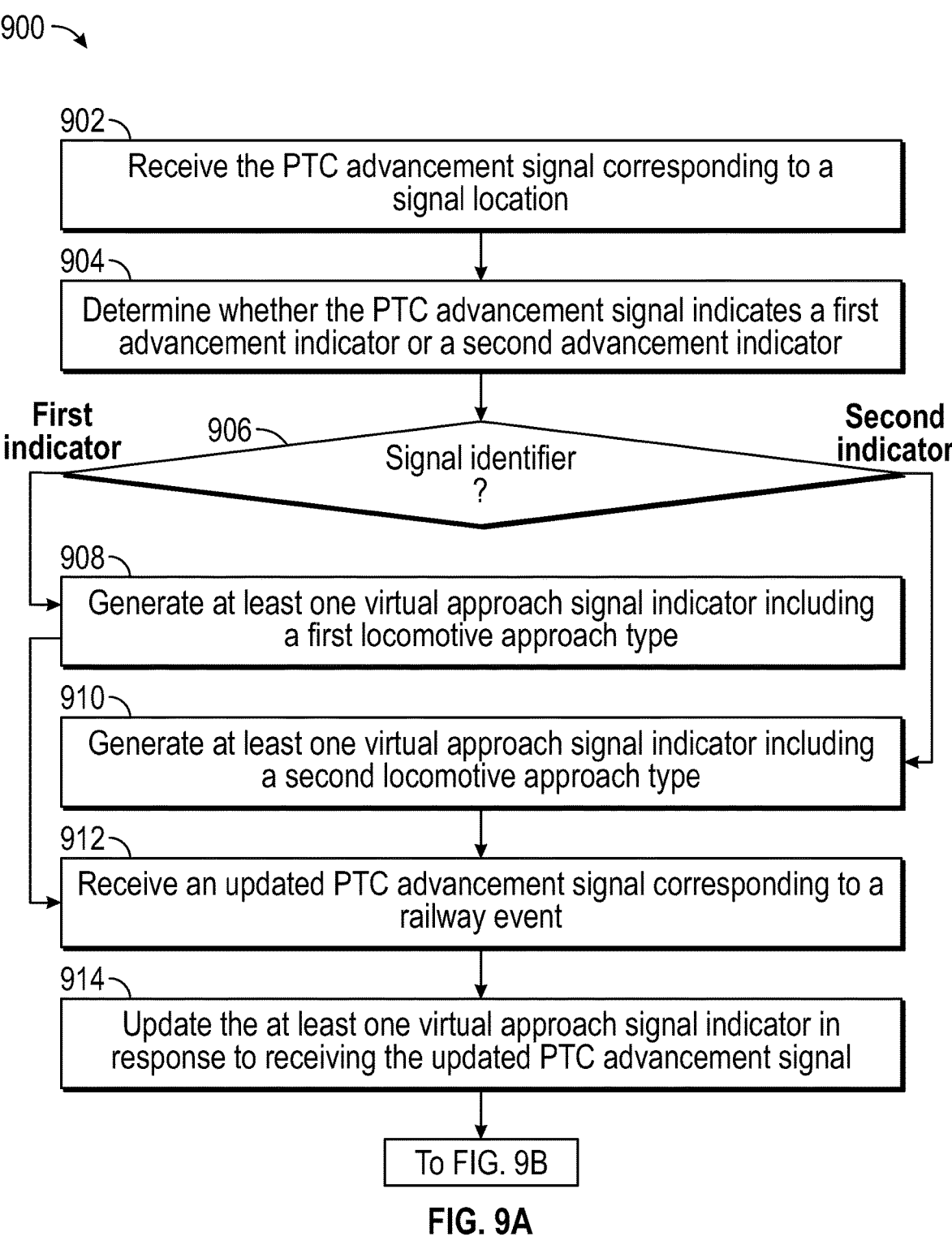

902

Receive the PTC advancement signal corresponding to a signal location

904

Determine whether the PTC advancement signal indicates a first advancement indicator or a second advancement indicator

First indicator          906          Second indicator

Signal identifier
?

908

Generate at least one virtual approach signal indicator including a first locomotive approach type

910

Generate at least one virtual approach signal indicator including a second locomotive approach type

912

Receive an updated PTC advancement signal corresponding to a railway event

914

Update the at least one virtual approach signal indicator in response to receiving the updated PTC advancement signal To FIG. 9B

SYSTEM AND METHOD FOR A VIRTUAL APPROACH SIGNAL

TECHNICAL FIELD

The present disclosure relates generally to the generating virtual signals between physical signaling hardware, particularly systems and methods for providing virtual approach signaling between physical signaling components based on a positive train control (PTC) advancement signal.

BACKGROUND

Railway centralized traffic control (CTC) operations enable efficient use of railways, locomotives, and resources. The data acquired across the railway is useful in optimizing capacity of locomotives across a segment of track. The industry trend is positive train control (PTC). PTC enables efficient use of a railway through implementing a combination of physical and virtual blocks along the track. The segments of track can include corresponding signal locations, which are physical signaling components indicating a current status of the next segment of track to operators of the locomotive. The signal locations are physically separated from one another to maximize impact while maintaining efficient communication to the operators. However, the signal locations might be late to update the physical signaling components in response to railway events occurring in the next segment of track. For example, the CTC system will react to the railway event and transmit an updated PTC enforcement signal to the signal location, which might update the physical signaling components while the locomotive is already traveling along the next segment of track.

Railroad operations currently adhere to PTC speed enforcement rules for the operators to lock in the locomotive speed at each signal location. Thus, when the locomotive approaches the signal location, the speed identified by the signal location is the speed at which the locomotive must travel the entire length of the next segment of track. The delay in updating the physical signaling components can cause the operators issues by restricting the locomotive speed across the entire length of the next segment of track, even when the speed restriction is unnecessary. The industry trend is for the locomotive operators typically to wait idle at an approach location until the physical signaling components indicate the next segment of track is all clear for the locomotive to proceed without any reduction in speed. The reduction in speed can significantly reduce the capacity of the segment of track and the velocity at which the locomotive can travel. Delaying the capacity and reducing the velocity leads to inefficient uses of the railway.

The present disclosure addresses the shortcomings of the traditional approach by splitting the segment of track into sections and providing virtual approach signals for each section, so the operators can rely on the virtual approach signals rather than the physical signaling components to set the speed of the locomotive. For example, the virtual approach signals can be used to identify an updated signal indicator allowing an increase speed while the locomotive is traveling along the segment of track. When the signal location receives the updated PTC enforcement signal while the locomotive is traveling along the segment of track, the virtual approach signals update allowing the operator to increase the speed of the locomotive significantly increasing capacity of the segment of track and velocity of the locomotive.

SUMMARY

The present disclosure achieves technical advantages as a system and method for providing virtual approach signaling between physical signaling components. The present disclosure provides for a system integrated into a practical application with meaningful limitations capable of generating virtual approach signal indicators to increase an efficiency along a segment of track. The system can provide a signal for the locomotive to increase the speed at which the locomotive can travel along the segment of track based on the virtual approach signal indicators, rather than physical signal components. The system can provide enhanced safety along the segment of track by automating the virtual approach signal indicators for the locomotive. The automation can remove guess work by the operator as to whether the physical signaling component is accurate. The system and method can provide a reduced cost through the efficiency gains along the railway by upgrading the virtual approach signal to an all-clear indication removing any speed restrictions previously binding the locomotive. The system and method can provide a modular signaling ability to enhance a capacity along the segment of track.

Accordingly, the present disclosure discloses concepts inextricably tied to computer technology such that the present disclosure provides the technological benefit of virtualizing railway signaling technology. For example, based on PTC communication, the virtualization of signaling technology can enable a wayside system to communicate the updated indicator from the CTC system to the locomotive for display on a PTC onboard terminal. Additionally, the system can provide rapid downgrading of the virtual approach signal in response to hazardous railway events, such as a broken rail, hand throw (HT) switch, or an occupied track. Alternatively, the system can provide rapid upgrading of the virtual approach signal in response to beneficial railway events, such as a clear track ahead or removal of any obstacles previously blocking the track.

The present disclosure provides a technological solution missing from conventional systems by at least providing virtual signaling components for operators to identify the status of the track prior to the locomotive reaching the physical signaling components. In this manner, the traditional approach is lacking an ability for the operator to verify an updated status of the track on which the locomotive is traveling. By restricting the operator to the traditional approaches, the operator is literally restricted from increasing the locomotive speed and can be less efficient in transportation. Ultimately, the segment of track can go underused for transporting locomotives, cargo, and passengers. The inefficiencies can devastate a railroad organization. The present disclosure avoids adding strain on an already overspent system by providing at least the following functionality:

Providing virtual approach signals along a segment of track between physical signaling components for modular signal updating;

Increasing a capacity of locomotives allowed along the segment of track in addition to a velocity with which the locomotives can travel;

Enhancing safety of operators, crew, and passengers by providing updated signaling according to current statuses of the segment of track; and Reducing costs to a railway organization by optimizing use of the segment of track and minimizing time spent idle for the locomotive.

It is an object of the invention to provide a method for providing virtual approach signaling between physical signaling components. It is a further object of the invention to provide a wayside system for providing virtual approach signaling between physical signaling components. It is a further object of the invention to provide a computer-implemented method for providing virtual approach signaling between physical signaling components. These and other objects are provided by at least the following embodiments.

In one embodiment, a method for providing virtual approach signaling between physical signaling components, comprising: receiving a PTC advancement signal corresponding to a signal location; determining whether the PTC advancement signal indicates a first advancement indicator or a second advancement indicator; generating at least one virtual approach signal indicator including a first locomotive approach type, when the PTC advancement signal indicates the first advancement indicator; generating the at least one virtual approach signal indicator including a second locomotive approach type, when the PTC advancement signal indicates the second advancement indicator; receiving an updated PTC advancement signal corresponding to a railway event of the signal location; and updating the at least one virtual approach signal indicator in response to receiving the updated PTC advancement signal. Wherein the first advancement indicator includes a red signal indicator or a flashing red signal indicator. Wherein the second advancement indicator includes a yellow signal indicator, a flashing yellow signal indicator, or a green signal indicator. Wherein the first locomotive approach type includes a reduced-speed indicator. Wherein the second locomotive approach type includes an open track indicator. Wherein the method further comprises upgrading the at least one virtual approach signal indicator from the first locomotive approach type to the second locomotive approach type when the PTC advancement signal changes from the first advancement indicator to the second advancement indicator. Wherein the method further comprises downgrading the at least one virtual approach signal indicator from the second locomotive approach type to the first locomotive approach type when the PTC advancement signal changes from the second advancement indicator to the first advancement indicator. Wherein the at least one virtual approach signal indicator corresponds to a mapping file. Wherein the railway event includes a broken rail, an occupied track, an unoccupied track, or a hand-throw switch. Wherein the method further comprises locating the virtual approach signal between the physical signaling components based on geolocation data.

In another embodiment, a wayside system for providing virtual approach signaling between physical signaling components, comprising: a PTC onboard computer; and a processor configured to perform the steps of receiving a PTC advancement signal corresponding to a signal location; determining whether the PTC advancement signal indicates a first advancement indicator or a second advancement indicator; generating at least one virtual approach signal indicator including a first locomotive approach type, when the PTC advancement signal indicates the first advancement indicator; generating the at least one virtual approach signal indicator including a second locomotive approach type, when the PTC advancement signal indicates the second advancement indicator; receiving an updated PTC advancement signal corresponding to a railway event of the signal location; and updating the at least one virtual approach signal indicator in response to receiving the updated PTC advancement signal. Wherein the first advancement indicator includes a red signal indicator or a flashing red signal indicator. Wherein the second advancement indicator includes a yellow signal indicator, a flashing yellow signal indicator, or a green signal indicator. Wherein the first locomotive approach type includes a reduced-speed indicator. Wherein the second locomotive approach type includes an open track indicator. Wherein the processor is further configured to perform the step of upgrading the at least one virtual approach signal indicator from the first locomotive approach type to the second locomotive approach type when the PTC advancement signal changes from the first advancement indicator to the second advancement indicator. Wherein the processor is further configured to perform the step of downgrading the at least one virtual approach signal indicator from the second locomotive approach type to the first locomotive approach type when the PTC advancement signal changes from the second advancement indicator to the first advancement indicator. Wherein the virtual approach signal indicator corresponds to a mapping file. Wherein the railway event includes a broken rail, an occupied track, an unoccupied track, or a hand-throw switch. Wherein the wayside system is further configured to locate the virtual approach signal indicator between the physical signaling components based on geolocation data.

In another embodiment, a computer-implemented method for providing virtual approach signaling between physical signaling components, the computer-implemented method comprising: receiving a PTC advancement signal corresponding to a signal location; determining whether the PTC advancement signal indicates a first advancement indicator or a second advancement indicator; generating at least one virtual approach signal indicator including a first locomotive approach type, when the PTC advancement signal indicates the first advancement indicator; generating the at least one virtual approach signal indicator including a second locomotive approach type, when the PTC advancement signal indicates the second advancement indicator; receiving an updated PTC advancement signal corresponding to a railway event of the signal location; and updating the at least one virtual approach signal indicator in response to receiving the updated PTC advancement signal. Wherein the first advancement indicator includes a red signal indicator or a flashing red signal indicator. Wherein the second advancement indicator includes a yellow signal indicator, a flashing yellow signal indicator, or a green signal indicator. Wherein the first locomotive approach type includes a reduced-speed indicator. Wherein the second locomotive approach type includes a full-speed indicator. Wherein the computer-implemented method further comprising upgrading the at least one virtual approach signal indicator from the first locomotive approach type to the second locomotive approach type when the PTC advancement signal changes from the first advancement indicator to the second advancement indicator. Wherein the computer-implemented method further comprising downgrading the at least one virtual approach signal indicator from the second locomotive approach type to the first locomotive approach type when the PTC advancement signal changes from the second advancement indicator to the first advancement indicator. Wherein the virtual approach signal indicator corresponds to a mapping file. Wherein the railway event includes a broken rail, an occupied track, an unoccupied track, or a hand-throw switch. Wherein the computer-implemented method further comprising locating the virtual approach signal indicator between the physical signaling components based on geolocation data.

BRIEF DESCRIPTION OF THE DRAWINGS

The present disclosure will be readily understood by the following detailed description, taken in conjunction with the accompanying drawings that illustrate, by way of example, the principles of the present disclosure. The drawings illustrate the design and utility of one or more exemplary embodiments of the present disclosure, in which like elements are referred to by like reference numbers or symbols. The objects and elements in the drawings are not necessarily drawn to scale, proportion, or precise positional relationship. Instead, emphasis is focused on illustrating the principles of the present disclosure.

FIGS. 3A-3I illustrate a virtual approach signaling system, in accordance with one or more exemplary embodiments of the present disclosure;

FIG. 5 illustrates a flowchart of a process for virtual approach signaling, in accordance with one or more exemplary embodiments of the present disclosure;

FIG. 6 illustrates a flowchart of a process for virtual approach signaling, in accordance with one or more exemplary embodiments of the present disclosure; and FIG. 7 illustrates a flowchart of a process for virtual approach signaling, in accordance with one or more exemplary embodiments of the present disclosure;

FIG. 8 illustrates a flowchart of a process for virtual approach signaling, in accordance with one or more exemplary embodiments of the present disclosure; and FIGS. 9A and 9B illustrate a flowchart for virtual approach signaling control logic, in accordance with one or more exemplary embodiments of the present disclosure.

DETAILED DESCRIPTION

Figure 1:
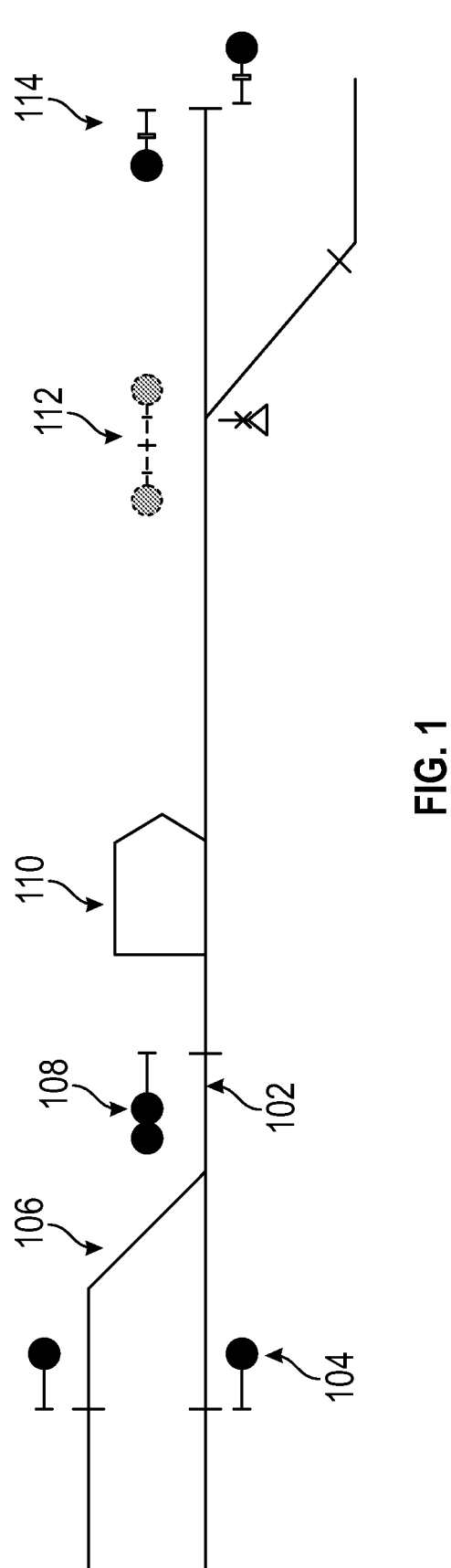
FIG. 1 illustrates a virtual approach signaling system, in accordance with one or more exemplary embodiments of the present disclosure.

The disclosure presented in the following written description and the various features and advantageous details thereof, are explained more fully with reference to the non-limiting examples included in the accompanying drawings and as detailed in the description. Descriptions of well-known components have been omitted to not unnecessarily obscure the principal features described herein. The examples used in the following description are intended to facilitate an understanding of the ways in which the disclosure can be implemented and practiced. A person of ordinary skill in the art would read this disclosure to mean that any suitable combination of the functionality or exemplary embodiments below could be combined to achieve the subject matter claimed. The disclosure includes either a representative number of species falling within the scope of the genus or structural features common to the members of the genus so that one of ordinary skill in the art can recognize the members of the genus. Accordingly, these examples should not be construed as limiting the scope of the claims.

A person of ordinary skill in the art would understand that any system claims presented herein encompass all of the elements and limitations disclosed therein, and as such, require that each system claim be viewed as a whole. Any reasonably foreseeable items functionally related to the claims are also relevant. The Examiner, after having obtained a thorough understanding of the disclosure and claims of the present application has searched the prior art as disclosed in patents and other published documents, i.e., nonpatent literature. Therefore, as evidenced by issuance of this patent, the prior art fails to disclose or teach the elements and limitations presented in the claims as enabled by the specification and drawings, such that the presented claims are patentable under the applicable laws and rules of this jurisdiction.

The section of track depicted in FIGS. 1-4 represents physical track partially shown between absolute and intermediate signal locations. CTC guidance can control physical signals for each of the segments of track (e.g., 102, 202, 302, and 402). CTC systems can consist of a centralized train dispatcher office that controls railroad interlockings and traffic flows in portions of the rail system designated as CTC territory. The CTC can include a control panel with a graphical depiction of the railroad. On this panel, the dispatcher can keep track of locations of various locomotives across the territory that the dispatcher controls. Expansive railroads can include multiple dispatcher offices and even multiple dispatchers for each operating division. In an embodiment, the segments of track can be separated by conventional rail joints with corresponding signal control houses. The signal control houses can be associated with respective joints. Each signaling house can transmit on the track on both sides of a corresponding insulated joint. In one embodiment, each physical track segment can be partitioned using virtual approach signals. In the illustrated embodiment, these approach signals can be set using CTC by a railway organization using PTC communication methods, although in alternate embodiments, the number of virtual approach signals per physical track segment can vary. The track can continue with this convention indefinitely with wayside systems and additional sections of track.

In an embodiment, the CTC system makes use of railway signals to convey instructions from the dispatcher to the locomotives. The railway signals take the form of routing decisions at controlled points authorizing a train to proceed or stop. Local signaling logic will ultimately determine the exact signal to display based on track occupancy, status ahead, and the exact route the train needs to take, so the only input required from the CTC system amounts to the go, no-go instruction. Signals in CTC territory are one of two types: an absolute signal, which is directly controlled by the train dispatcher and helps design the limits of a control point, or an intermediate signal, which is automatically controlled by the conditions of the track and by the condition of the following signal. Train dispatchers cannot directly control intermediate signals and so are almost always excluded from the control display for the dispatcher except as an inert reference.

The majority of control points are equipped with remote control, power-operated switches. These switches often are dual-controlled switches, as they may be either remotely controlled by the train dispatcher or by manually operating a lever or pump on the switch mechanism itself (although the train dispatcher's permission is generally required to do so). These switches may lead to a passing siding, or they may take the form of a crossover, which allows movement to an adjacent track, or a "turnout" which routes a train to an alternate track (or route).

In the figures below, colors are represented in the figures as follows: green signals are black outline without any color filled in, yellow signals are black outline with gray fill, and red signals are black outline with black fill. In some embodiments, the virtual approach signals are indicated with a dashed outline to indicate the virtual nature of the element. The fences are visually represented as follows: yellow PTC fences are represented as forward slash hatching and red PTC fences are represented as backward slash hatching. In no way are the color transformations meant to be a limitation on any of the discussion below.

FIG. 1 illustrates an exemplary embodiment of a virtual approach signaling system 100. The combination of the CTC system and a locomotive with PTC functionality allow the ability to split the segment of track into two or more sections with a virtual approach signal. The virtual approach signaling system 100 can include a segment of track 102, an eastbound absolute signaling location 104, an approach location 106, a westbound absolute signaling location 108, a locomotive 110, a virtual approach signal 112, and an intermediate signaling location 114.

The segment of track 102, in an embodiment, can include a segment of railway on which a locomotive can travel. For example, the segment of track 102 can include physical railway assets such as rail, rail ties, ballast, spikes, and any other physical railway components to allow the locomotive to travel along the segment of track. In an example, the segment of track 102 can include electronic circuitry to transmit a signal across the rail to indicate various railway events. For example, the electronic circuitry can transmit an electronic signal across the rail and receive a response signal. The electronic circuitry can identify whether the rail is occupied by another locomotive, the rail is broken, or another type of railway event. In another example, the electronic circuitry can enable the PTC onboard terminal to update the virtual approach signal while the segment of track includes a restriction for locomotive travel. In another example, the segment of track 102 can include signals as a combination of absolute signals and intermediate signals.

The eastbound absolute signaling location 104, in an embodiment, can indicate to the locomotive a status of the segment of track along the eastbound direction of the locomotive. For example, absolute signals can protect traffic operations and of a CTC interlocking from hazardous events and can be under direct control by the dispatcher. A CTC interlocking location is often referred to as a control point. The most restrictive indication from the absolute signal is "stop," because proceeding past the signal can result in the locomotive entering directly into a route of another locomotive. For example, the "stop" indicator can include a red signal or flashing red signal.

The approach location 106, in an embodiment, can indicate an "approach" limit for the locomotive. For example, PTC operations limit a speed of the locomotive when the approach location 106 indicates an "approach" limit. In an example, the "approach" limit can indicate extra precaution when entering the segment of track. For example, the "approach" limit can indicate an must follow the requirements, human error can play a role in misjudging the traffic operations along the segment of track.

The westbound absolute signaling location 108, in an embodiment, can indicate to the locomotive a status of the segment of track along the westbound direction of another locomotive. For example, absolute signals can protect traffic operations and of a CTC interlocking from hazardous events and can be under direct control by the dispatcher. A CTC interlocking location is often referred to as a control point. The most restrictive indication from the absolute signal is "stop," because proceeding past the signal can result in the locomotive entering directly into a route of another locomotive. For example, the "stop" indicator can include a red signal or flashing red signal.

The locomotive 110, in an embodiment, can include a rail transport vehicle providing motive power to travel along the segment of track 102. For example, the locomotive 110 can include any type of rail transport vehicle traveling along the segment of track. In no way is the use of "locomotive" intended to be restrictive to a specific type of rail transport vehicle, rather "locomotive" is used to encompass the various rail transport vehicle to use the technology in the present disclosure. The locomotive 110 can include any rail transport vehicle. In another example, the locomotive 110 can include any rail transport vehicle including PTC capabilities. The locomotive 110 can include a PTC onboard terminal to process traffic operations along the segment of track. In another example, the PTC onboard terminal can display the signal indicators.

The virtual approach signal 112, in an embodiment, can include digitally generated indicators to display on the PTC onboard terminal. For example, the PTC onboard terminal can include a digital representation of the segment of track including the various absolute signals and intermediate signals. The PTC onboard terminal can include the virtual approach signal 112 as a signaling component between physical signaling components. The virtual approach signal 112 indicates signal identifiers corresponding to the signal location. For example, if the signal location includes a red signal indicator or flashing red signal indicator, the virtual approach signal 112 can include a yellow signal indicator. The yellow signal indicator can communicate to the operator the locomotive is to reduce speed in the next segment of track. Alternatively, if the signal location includes a yellow signal indicator, flashing yellow signal indicator, or green signal indicator, the virtual approach signal 112 can include a green signal indicator. The green signal indicator can communicate to the operator the locomotive can travel at full speed in the next segment of track. In another example, the segment of track can include a plurality of virtual approach signals. For example, the segment of track can include as many virtual approach signals applicable for safety requirements. In another example, the segment of track can include the virtual approach signal 112 at a particular location along the segment of track. The particular location can correspond to global positioning system (GPS) data, geographic information system (GIS) data, latitude-longitude data, milepost data, or any other type of geolocation data relevant to the virtual approach signal 112.

The intermediate signaling location 114, in an embodiment, can provide automatic signaling based on absolute signals (e.g., the eastbound absolute signaling location 104). Intermediate signals are found on the line between control points. The intermediate signals cannot be directly controlled by the dispatcher. Intermediate signals normally display "Stop then Proceed" as their most restrictive aspect. The intermediate signal in CTC territory will always authorize a train to continue.

Figures 2A, 2B:
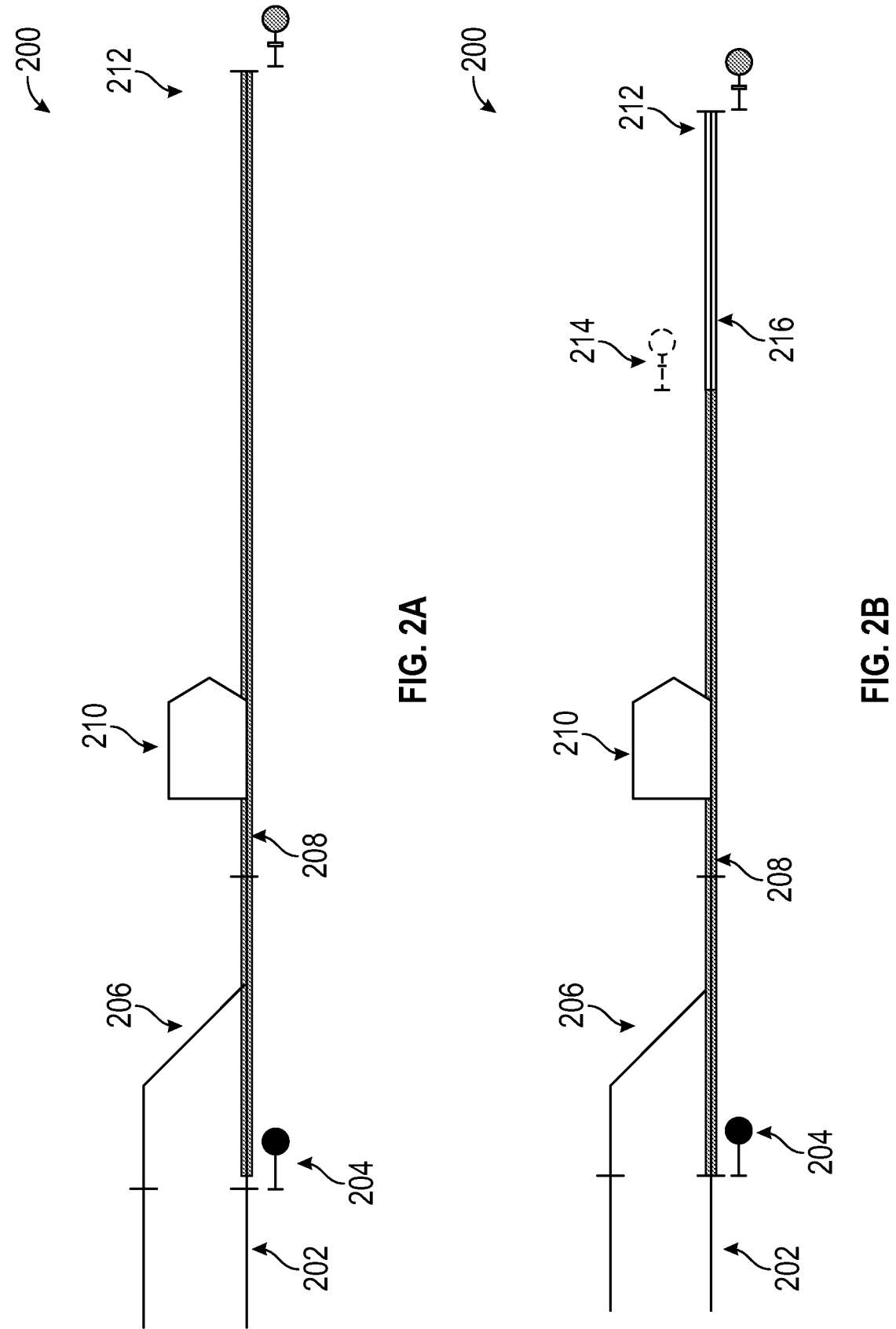
FIGS. 2A and 2B illustrate a virtual approach signaling system, in accordance with one or more exemplary embodiments of the present disclosure.

FIGS. 2A and 2B illustrate an exemplary embodiment of a virtual approach signaling system 200. The combination of the CTC system and a locomotive with PTC functionality allow the ability to split the segment of track into two or more sections with a virtual approach signal. The virtual approach signaling system 200 illustrates an event when the segment of track lacks any virtual approach signal. In an example, the virtual approach signaling system 200 can include a segment of track 202, an eastbound absolute signaling location 204, an approach location 206, a PTC enforcement response 208, a locomotive 210, and an intermediate signaling location 212.

The segment of track 202, in an embodiment, can include a segment of railway on which a locomotive can travel. For example, the segment of track 202 can include physical railway assets such as rail, rail ties, ballast, spikes, and any other physical railway components to allow the locomotive to travel along the segment of track. In an example, the segment of track 202 can include electronic circuitry to transmit a signal across the rail to indicate various railway events. For example, the electronic circuitry can transmit an electronic signal across the rail and receive a response signal. The electronic circuitry can identify whether the rail is occupied by another locomotive, the rail is broken, or another type of railway event. In another example, the electronic circuitry can enable the PTC onboard terminal to update the virtual approach signal while the segment of track includes a restriction for locomotive travel. In another example, the segment of track 202 can include signals as a combination of absolute signals and intermediate signals.

The eastbound absolute signaling location 204, in an embodiment, can indicate to the locomotive a status of the segment of track along the eastbound direction of the locomotive. For example, absolute signals can protect traffic operations and of a CTC interlocking from hazardous events and can be under direct control by the dispatcher. A CTC interlocking location is often referred to as a control point. The most restrictive indication from the absolute signal is "stop," because proceeding past the signal can result in the locomotive entering directly into a route of another locomotive. For example, the "stop" indicator can include a red signal or flashing red signal.

The approach location 206, in an embodiment, can indicate an "approach" limit for the locomotive. For example, PTC operations limit a speed of the locomotive when the approach location 206 indicates an "approach" limit. In an example, the "approach" limit can indicate extra precaution when entering the segment of track. For example, the "approach" limit can indicate an increased probability of another locomotive entering the segment of track. While the locomotives must follow the requirements, human error can play a role in misjudging the traffic operations along the segment of track.

The PTC enforcement response 208, in an embodiment, can indicate to the locomotive a status of the segment of track along the westbound direction of another locomotive. For example, absolute signals can protect traffic operations and of a CTC interlocking from hazardous events and can be under direct control by the dispatcher. A CTC interlocking location is often referred to as a control point. The most restrictive indication from the absolute signal is "stop," because proceeding past the signal can result in the locomotive entering directly into a route of another locomotive. For example, the "stop" indicator can include a red signal or flashing red signal.

The locomotive 210, in an embodiment, can include a rail transport vehicle providing motive power to travel along the segment of track 202. For example, the locomotive 210 can include any type of rail transport vehicle traveling along the segment of track. In no way is the use of "locomotive" intended to be restrictive to a specific type of rail transport vehicle, rather "locomotive" is used to encompass the various rail transport vehicle to use the technology in the present disclosure. The locomotive 210 can include any rail transport vehicle. In another example, the locomotive 210 can include any rail transport vehicle including PTC capabilities. The locomotive 210 can include a PTC onboard terminal to process traffic operations along the segment of track. In another example, the PTC onboard terminal can display the signal indicators.

The intermediate signaling location 212, in an embodiment, can provide automatic signaling based on absolute signals (e.g., the absolute signaling location 204). Intermediate signals are found on the line between control points. The intermediate signals cannot be directly controlled by the dispatcher. Intermediate signals normally display "Stop then Proceed" as their most restrictive aspect. The intermediate signal in CTC territory will always authorize a train to continue.

The virtual approach signal 214, in an embodiment, can include digitally generated indicators to display on the PTC onboard terminal. For example, the PTC onboard terminal can include a digital representation of the segment of track including the various absolute signals and intermediate signals. The PTC onboard terminal can include the virtual approach signal 214 as a signaling component between physical signaling components. The virtual approach signal 214 indicates signal identifiers corresponding to the signal location. For example, if the signal location includes a red signal indicator or flashing red signal indicator, the virtual approach signal 214 can include a yellow signal indicator. The yellow signal indicator can communicate to the operator the locomotive is to reduce speed in the next segment of track. Alternatively, if the signal location includes a yellow signal indicator, flashing yellow signal indicator, or green signal indicator, the virtual approach signal 214 can include a green signal indicator. The green signal indicator can communicate to the operator the locomotive can travel at full speed in the next segment of track. In another example, the segment of track can include a plurality of virtual approach signals. For example, the segment of track can include as many virtual approach signals applicable for safety requirements. In another example, the segment of track can include the virtual approach signal 214 at a particular location along the segment of track. The particular location can correspond to global positioning system (GPS) data, geographic information system (GIS) data, latitude-longitude data, milepost data, or any other type of geolocation data relevant to the virtual approach signal 214.

The PTC virtual approach enforcement response 216, in an embodiment, can indicate to the locomotive 210 the next segment of track after the virtual approach signal 214 is all clear. For example, the all clear indication can signal to the locomotive 210 to travel at full speed. In an example, the PTC virtual approach enforcement response 216 can correspond to the intermediate signaling location 212. For example, when the intermediate signaling location 212 indicates an "approach" limit, the PTC virtual approach enforcement response 216 can indicate an all clear signal allowing the locomotive 210 to travel at full speed through the next segment of track. Alternatively, when the intermediate signaling location 212 indicates a "stop" restriction, the PTC virtual approach enforcement response 216 can indicate a restriction signal resulting in the locomotive 210 reducing its speed along the next segment of track.

Referring to FIG. 2A, the locomotive 210 can travel along the segment of track 202 passing the approach location 206 and the absolute signal 204. The segment of track 202 lacks a virtual approach signal, leaving the locomotive 210 to travel at reduced speed for the entire segment.

Referring to FIG. 2B, the locomotive 210 can travel along the segment of track 202 passing the approach location 206 and the absolute signal 204. The locomotive 210 approaches the virtual approach signal 214, signaling to the locomotive to travel at full speed when the locomotive 210 reaches a location of the virtual approach signal 214.

FIGS. 3A-3I illustrate an exemplary embodiment of a virtual approach signaling system 300. The combination of the CTC system and a locomotive with PTC functionality allow the ability to split the segment of track into two or more sections with a virtual approach signal. In an embodiment, the virtual approach signaling system 300 can represent a leading locomotive along the segment of track, without any obstructions along the track. All the signals and indicators allow for the locomotive to travel at full speed the entire length of the segment of track. The virtual approach signaling system 300 can include a segment of track 302, a first eastbound absolute signaling location 304, an approach location 306, a westbound absolute signaling location 308, a locomotive 310, virtual approach signals 312*a-d*, intermediate signaling locations 314*a-d*, a PTC virtual approach enforcement response 316, and a second eastbound absolute signaling location 318.

The segment of track 302, in an embodiment, can include a segment of railway on which a locomotive can travel. For example, the segment of track 302 can include physical railway assets such as rail, rail ties, ballast, spikes, and any other physical railway components to allow the locomotive to travel along the segment of track. In an example, the segment of track 302 can include electronic circuitry to transmit a signal across the rail to indicate various railway events. For example, the electronic circuitry can transmit an electronic signal across the rail and receive a response signal. The electronic circuitry can identify whether the rail is occupied by another locomotive, the rail is broken, or another type of railway event. In another example, the electronic circuitry can enable the PTC onboard terminal to update the virtual approach signal while the segment of track includes a restriction for locomotive travel. In another example, the segment of track 302 can include signals as a combination of absolute signals and intermediate signals.

The first eastbound absolute signaling location 304, in an embodiment, can indicate to the locomotive a status of the segment of track along the eastbound direction of the locomotive. For example, absolute signals can protect traffic operations and of a CTC interlocking from hazardous events and can be under direct control by the dispatcher. A CTC interlocking location is often referred to as a control point. The most restrictive indication from the absolute signal is "stop," because proceeding past the signal can result in the locomotive entering directly into a route of another locomotive. For example, the "stop" indicator can include a red signal or flashing red signal.

The approach location 306, in an embodiment, can indicate an "approach" limit for the locomotive. For example, PTC operations limit a speed of the locomotive when the approach location 306 indicates an "approach" limit. In an example, the "approach" limit can indicate extra precaution when entering the segment of track. For example, the "approach" limit can indicate an increased probability of another locomotive entering the segment of track. While the locomotives must follow the requirements, human error can play a role in misjudging the traffic operations along the segment of track.

The westbound absolute signaling location 308, in an embodiment, can indicate to the locomotive a status of the segment of track along the westbound direction of another locomotive. For example, absolute signals can protect traffic operations and of a CTC interlocking from hazardous events and can be under direct control by the dispatcher. A CTC interlocking location is often referred to as a control point. The most restrictive indication from the absolute signal is "stop," because proceeding past the signal can result in the locomotive entering directly into a route of another locomotive. For example, the "stop" indicator can include a red signal or flashing red signal.

The locomotive 310, in an embodiment, can include a rail transport vehicle providing motive power to travel along the segment of track 302. For example, the locomotive 310 can include any type of rail transport vehicle traveling along the segment of track. In no way is the use of "locomotive" intended to be restrictive to a specific type of rail transport vehicle, rather "locomotive" is used to encompass the various rail transport vehicle to use the technology in the present disclosure. The locomotive 310 can include any rail transport vehicle. In another example, the locomotive 310 can include any rail transport vehicle including PTC capabilities. The locomotive 310 can include a PTC onboard terminal to process traffic operations along the segment of track. In another example, the PTC onboard terminal can display the signal indicators.

The virtual approach signals 312*a-d*, in an embodiment, can include digitally generated indicators to display on the PTC onboard terminal. For example, the PTC onboard terminal can include a digital representation of the segment of track including the various absolute signals and intermediate signals. The PTC onboard terminal can include the virtual approach signals 312*a-d* as a signaling component between physical signaling components. The virtual approach signals 312*a-d* indicates signal identifiers corresponding to the signal location. For example, if the signal location includes a red signal indicator or flashing red signal indicator, the virtual approach signals 312*a-d* can include a yellow signal indicator. The yellow signal indicator can communicate to the operator the locomotive is to reduce speed in the next segment of track. Alternatively, if the signal location includes a yellow signal indicator, flashing yellow signal indicator, or green signal indicator, the virtual approach signals 312*a-d* can include a green signal indicator. The green signal indicator can communicate to the operator the locomotive can travel at full speed in the next segment of track. In another example, the segment of track can include a plurality of virtual approach signals. For example, the segment of track can include as many virtual approach signals applicable for safety requirements. In another example, the segment of track can include the virtual approach signals 312*a-d* at a particular location along the segment of track. The particular location can correspond to global positioning system (GPS) data, geographic information system (GIS) data, latitude-longitude data, milepost data, or any other type of geolocation data relevant to the virtual approach signals 312*a-d*.

The intermediate signaling locations 314*a-d*, in an embodiment, can provide automatic signaling based on absolute signals (e.g., first eastbound absolute signaling location 304, second eastbound absolute signaling location 318, and westbound absolute signaling location 308). Intermediate signals are found on the line between control points. The intermediate signals cannot be directly controlled by the dispatcher. Intermediate signals normally display "Stop then Proceed" as their most restrictive aspect. The intermediate signal in CTC territory will always authorize a train to continue.

The PTC virtual approach enforcement response 316, in an embodiment, can indicate to the locomotive 310 the next segment of track after the virtual approach signal 314*a-d* is all clear. For example, the all clear indication can signal to the locomotive 310 to travel at full speed. In an example, the PTC virtual approach enforcement response 316 can correspond to the intermediate signaling location 312*a-d*. For example, when the intermediate signaling location 312*a-d* indicates an "approach" limit, the PTC virtual approach enforcement response 316 can indicate an all clear signal allowing the locomotive 310 to travel at full speed through the next segment of track. Alternatively, when the intermediate signaling location 312*a-d* indicates a "stop" restriction, the PTC virtual approach enforcement response 316 can indicate a restriction signal resulting in the locomotive 310 reducing its speed along the next segment of track.

The second eastbound absolute signaling location 318, in an embodiment, can indicate to the locomotive a status of the segment of track along the eastbound direction of the locomotive. For example, absolute signals can protect traffic operations and of a CTC interlocking from hazardous events and can be under direct control by the dispatcher. A CTC interlocking location is often referred to as a control point. The most restrictive indication from the absolute signal is "stop," because proceeding past the signal can result in the locomotive entering directly into a route of another locomotive. For example, the "stop" indicator can include a red signal or flashing red signal.

Figures 3A, 3B:
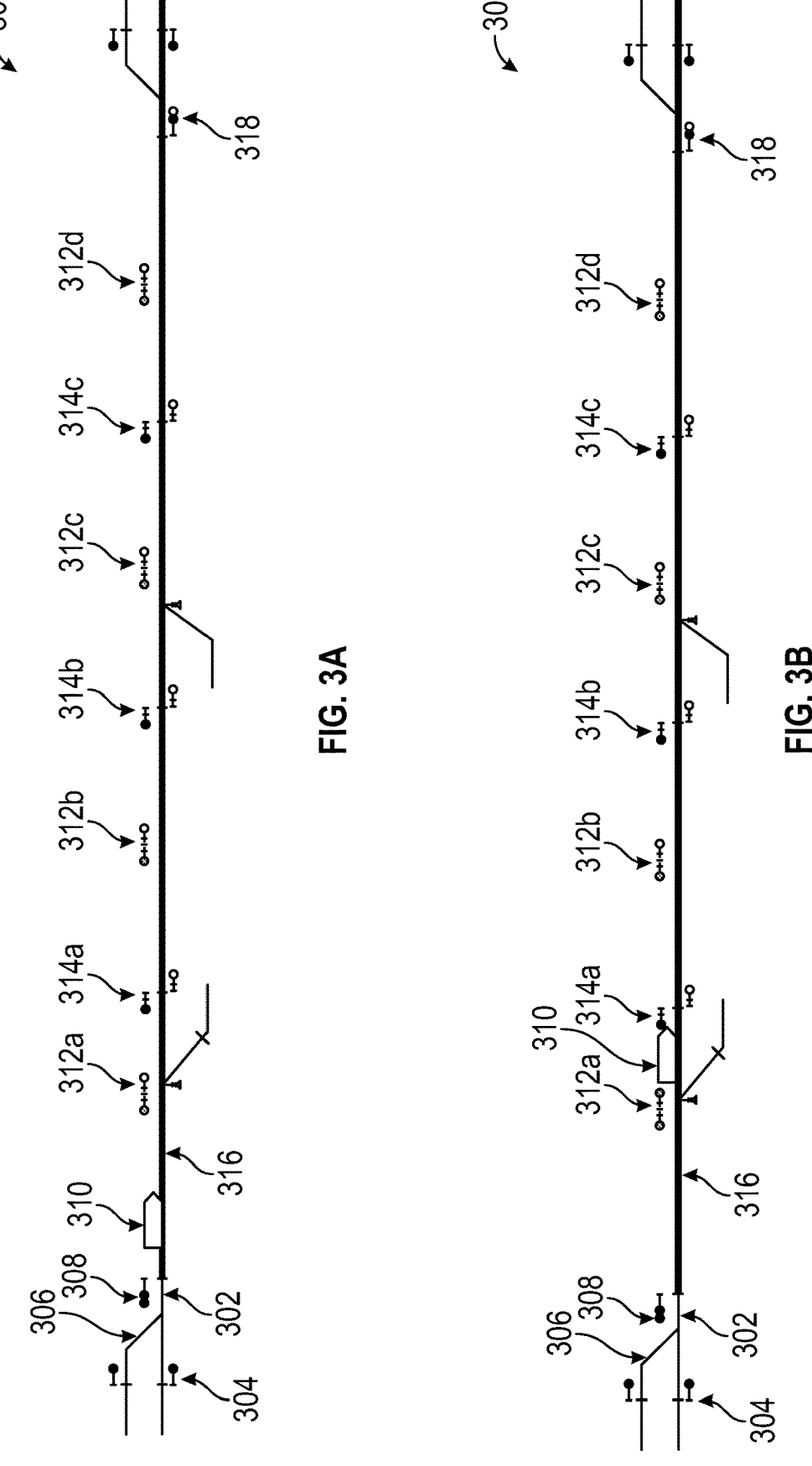

Referring to FIG. 3A, the locomotive 310 can travel along the segment of track 302 passing the approach location 306 and the eastbound absolute signal 304. The locomotive 310 approaches the virtual approach signal 312*a*, which indicates the next segment of track is all clear. In response to the virtual approach signal 312*a*, the PTC virtual approach enforcement response 316 includes an all clear indicator for the locomotive 310 to travel along the segment of track at full speed.

Referring to FIG. 3B, the locomotive 310 can travel along the segment of track 302 passing the virtual approach signal 312*a* and approaching the intermediate signaling location 314*a*. The intermediate signaling location 314*a* can indicate the next segment of track is all clear, confirming the virtual approach signal 312*a*. In response to the virtual approach signal 312*a*, the PTC virtual approach enforcement response 316 includes an all clear indicator for the locomotive 310 to travel along the segment of track at full speed.

Referring to FIG. 3C, the locomotive 310 can travel along the segment of track 302 passing the intermediate signaling location 314*a* and approaching the virtual approach signal 312*b*. The virtual approach signal 312*b* can indicate the next segment of track is all clear. In response to the virtual approach signal 312*b*, the PTC virtual approach enforcement response 316 includes an all clear indicator for the locomotive 310 to travel along the segment of track at full speed.

Referring to FIG. 3D, the locomotive 310 can travel along the segment of track 302 passing the virtual approach signal 312*b* and approaching the intermediate signaling location 314*b*. The intermediate signaling location 314*b* can indicate the next segment of track is all clear, confirming the virtual approach signal 312*b*. In response to the virtual approach signal 312*b*, the PTC virtual approach enforcement response 316 includes an all clear indicator for the locomotive 310 to travel along the segment of track at full speed.

Figures 3E, 3F:
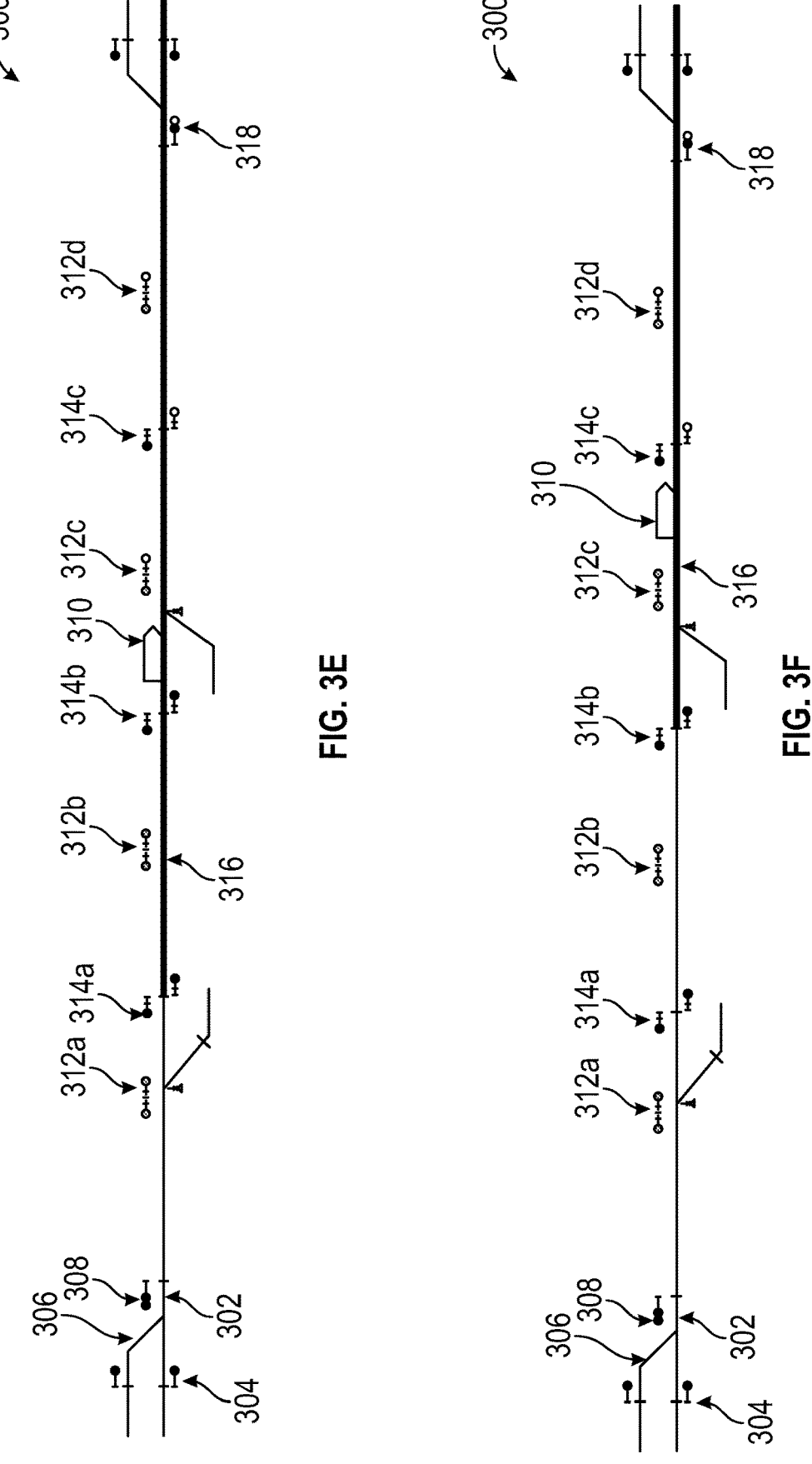

Referring to FIG. 3E, the locomotive 310 can travel along the segment of track 302 passing the intermediate signaling location 314*b* and approaching the virtual approach signal 312*c*. The virtual approach signal 312*c* can indicate the next segment of track is all clear. In response to the virtual approach signal 312*c*, the PTC virtual approach enforcement response 316 includes an all clear indicator for the locomotive 310 to travel along the segment of track at full speed.

Referring to FIG. 3F, the locomotive 310 can travel along the segment of track 302 passing the virtual approach signal 312*c* and approaching the intermediate signaling location 314*c*. The intermediate signaling location 314*c* can indicate the next segment of track is all clear, confirming the virtual approach signal 312*c*. In response to the virtual approach signal 312*c*, the PTC virtual approach enforcement response 316 includes an all clear indicator for the locomotive 310 to travel along the segment of track at full speed.

Figures 3G, 3H:
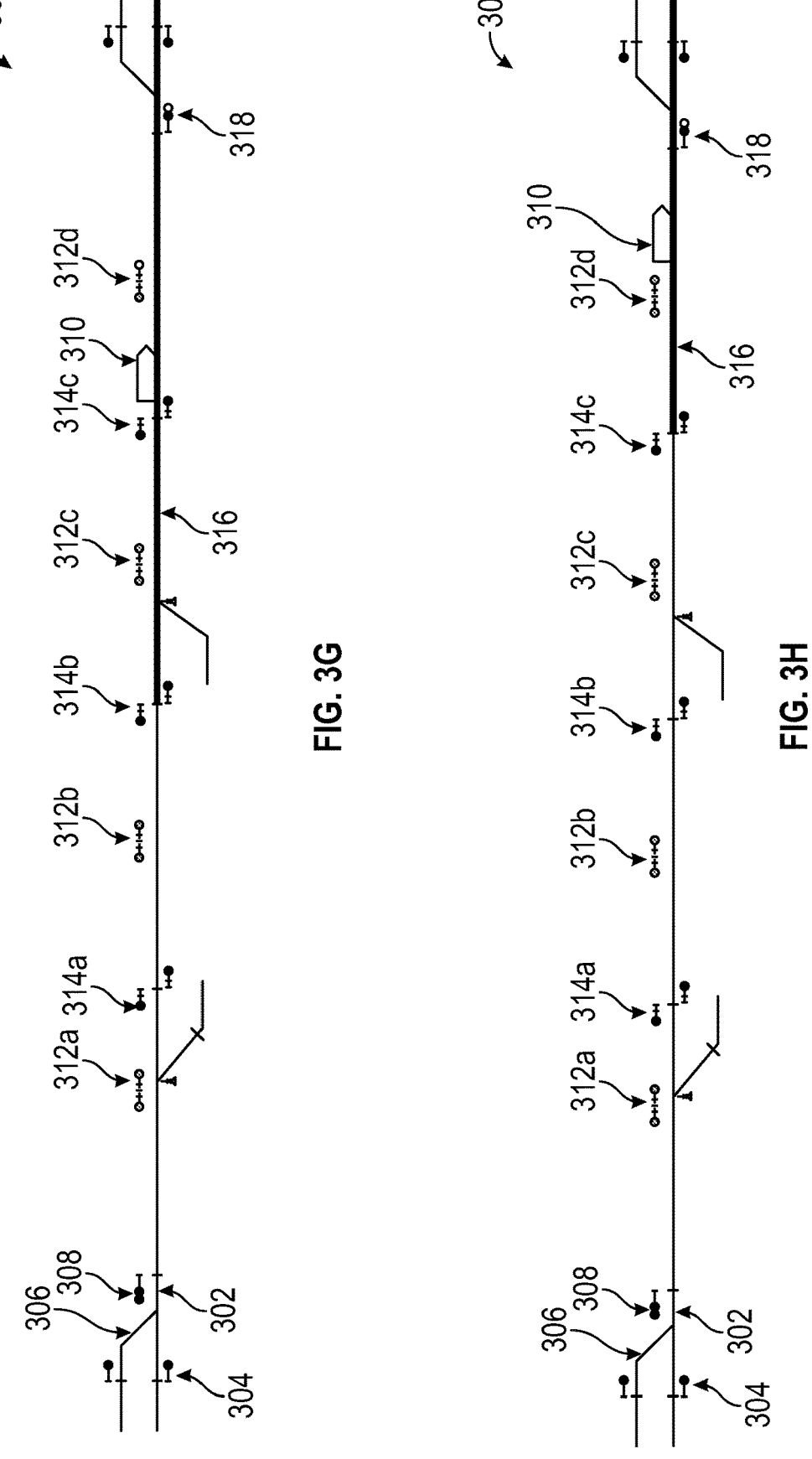

Referring to FIG. 3G, the locomotive 310 can travel along the segment of track 302 passing the intermediate signaling location 314*c* and approaching the virtual approach signal 312*d*. The virtual approach signal 312*d* can indicate the next segment of track is all clear. In response to the virtual approach signal 312*d*, the PTC virtual approach enforcement response 316 includes an all clear indicator for the locomotive 310 to travel along the segment of track at full speed.

Referring to FIG. 3H, the locomotive 310 can travel along the segment of track 302 passing the virtual approach signal 312*d* and approaching the eastbound absolute signaling location 318. The eastbound absolute signaling location 318 can indicate the next segment of track is all clear, confirming the virtual approach signal 312*d*. In response to the virtual approach signal 312*d*, the PTC virtual approach enforcement response 316 includes an all clear indicator for the locomotive 310 to travel along the segment of track at full speed.

Figure 3I:
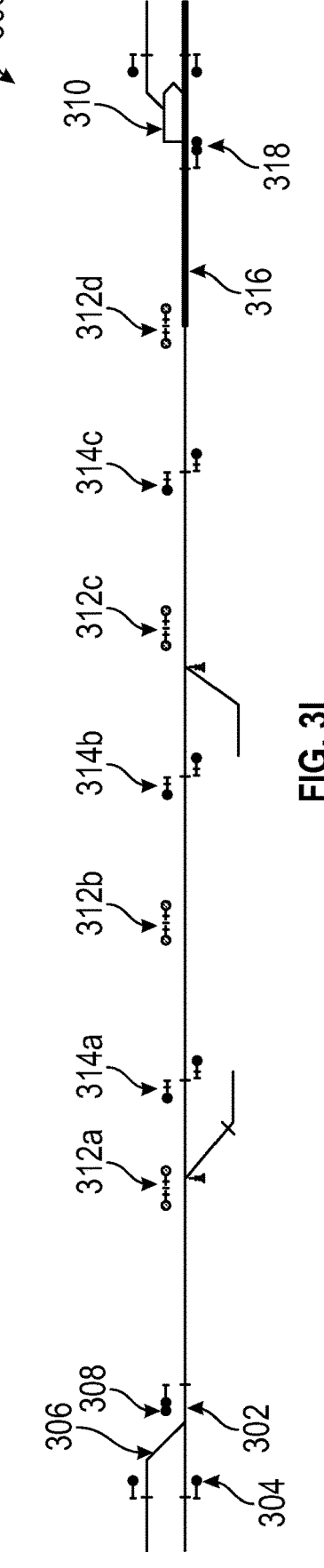

Referring to FIG. 3I, the locomotive 310 can travel along the segment of track 302 passing the eastbound absolute signaling location 318 and approaching a next segment of track not shown in FIG. 3I. The eastbound absolute signaling location 318 can change its indication from all clear to stop to ensure any following locomotives adhere to safety protocols.

FIGS. 4A-4J illustrate an exemplary embodiment of a virtual approach signaling system 400. The combination of the CTC system and a locomotive with PTC functionality allow the ability to split the segment of track into two or more sections with a virtual approach signal. In an embodiment, the virtual approach signaling system 400 can represent a following locomotive behind a leading locomotive recently passing along the segment of track. The signals and indicators can restrict the travel of the following locomotive to adhere to safety protocols. The virtual approach signaling system 400 can include a segment of track 402, a first eastbound absolute signaling location 404, an approach location 406, a westbound absolute signaling location 408, a locomotive 410, virtual approach signals 412*a-d*, intermediate signaling locations 414*a-c*, track sections 416*a-j*, and a second eastbound absolute signaling location 418.

The segment of track 402, in an embodiment, can include a segment of railway on which a locomotive can travel. For example, the segment of track 402 can include physical railway assets such as rail, rail ties, ballast, spikes, and any other physical railway components to allow the locomotive to travel along the segment of track. In an example, the segment of track 402 can include electronic circuitry to transmit a signal across the rail to indicate various railway events. For example, the electronic circuitry can transmit an electronic signal across the rail and receive a response signal. The electronic circuitry can identify whether the rail is occupied by another locomotive, the rail is broken, or another type of railway event. In another example, the electronic circuitry can enable the PTC onboard terminal to update the virtual approach signal while the segment of track includes a restriction for locomotive travel. In another example, the segment of track 302 can include signals as a combination of absolute signals and intermediate signals.

The eastbound absolute signaling location 404, in an embodiment, can indicate to the locomotive a status of the segment of track along the eastbound direction of the locomotive. For example, absolute signals can protect traffic operations and of a CTC interlocking from hazardous events and can be under direct control by the dispatcher. A CTC interlocking location is often referred to as a control point. The most restrictive indication from the absolute signal is "stop," because proceeding past the signal can result in the locomotive entering directly into a route of another locomotive. For example, the "stop" indicator can include a red signal or flashing red signal.

The approach location 406, in an embodiment, can indicate an "approach" limit for the locomotive. For example, PTC operations limit a speed of the locomotive when the approach location 406 indicates an "approach" limit. In an example, the "approach" limit can indicate extra precaution when entering the segment of track. For example, the "approach" limit can indicate an must follow the requirements, human error can play a role in misjudging the traffic operations along the segment of track.

The westbound absolute signaling location 408, in an embodiment, can indicate to the locomotive a status of the segment of track along the westbound direction of another locomotive. For example, absolute signals can protect traffic operations and of a CTC interlocking from hazardous events and can be under direct control by the dispatcher. A CTC interlocking location is often referred to as a control point. The most restrictive indication from the absolute signal is "stop," because proceeding past the signal can result in the locomotive entering directly into a route of another locomotive. For example, the "stop" indicator can include a red signal or flashing red signal.

The locomotive 410, in an embodiment, can include a rail transport vehicle providing motive power to travel along the segment of track 402. For example, the locomotive 410 can include any type of rail transport vehicle traveling along the segment of track. In no way is the use of "locomotive" intended to be restrictive to a specific type of rail transport vehicle, rather "locomotive" is used to encompass the various rail transport vehicle to use the technology in the present disclosure. The locomotive 410 can include any rail transport vehicle. In another example, the locomotive 410 can include any rail transport vehicle including PTC capabilities. The locomotive 410 can include a PTC onboard terminal to process traffic operations along the segment of track. In another example, the PTC onboard terminal can display the signal indicators.

The virtual approach signals 412*a-d*, in an embodiment, can include digitally generated indicators to display on the PTC onboard terminal. For example, the PTC onboard terminal can include a digital representation of the segment of track including the various absolute signals and intermediate signals. The PTC onboard terminal can include the virtual approach signals 412*a-d* as a signaling component between physical signaling components. The virtual approach signals 412*a-d* indicates signal identifiers corresponding to the signal location. For example, if the signal location includes a red signal indicator or flashing red signal indicator, the virtual approach signals 412*a-d* can include a yellow signal indicator. The yellow signal indicator can communicate to the operator the locomotive is to reduce speed in the next segment of track. Alternatively, if the signal location includes a yellow signal indicator, flashing yellow signal indicator, or green signal indicator, the virtual approach signals 412*a-d* can include a green signal indicator. The green signal indicator can communicate to the operator the locomotive can travel at full speed in the next segment of track. In another example, the segment of track can include a plurality of virtual approach signals. For example, the segment of track can include as many virtual approach signals applicable for safety requirements. In another example, the segment of track can include the virtual approach signals 412*a-d* at a particular location along the segment of track. The particular location can correspond to global positioning system (GPS) data, geographic information system (GIS) data, latitude-longitude data, milepost data, or any other type of geolocation data relevant to the virtual approach signals 412*a-d*.

The intermediate signaling locations 414*a-c*, in an embodiment, can provide automatic signaling based on absolute signals (e.g., first eastbound absolute signaling location 404, second eastbound absolute signaling location 418, and westbound absolute signaling location 408). Intermediate signals are found on the line between control points. The intermediate signals cannot be directly controlled by the dispatcher. Intermediate signals normally display "Stop then Proceed" as their most restrictive aspect. The intermediate signal in CTC territory will always authorize a train to continue.

The track sections 416*a-j*, in an embodiment, can identify a section of the segment of track 402 for reference. The track section 416*a* can identify the segment of track 402 between a previous segment of track and the westbound absolute signaling location 408. The track section 416*b* can identify the segment of track 402 between the westbound absolute signaling location 408 and the virtual approach signal 412*a*. The track section 416*c* can identify the segment of track 402 between the virtual approach signal 412*a* and the intermediate signaling location 414*a*. The track section 416*d* can identify the segment of track 402 between the intermediate signaling location 414*a* and the virtual approach signal 412*b*. The track section 416*e* can identify the segment of track 402 between the virtual approach signal 412*b* and the intermediate signaling location 414*b*. The track section 416*f* can identify the segment of track 402 between the intermediate signaling location 414*b* and the virtual approach signal 412*c*. The track section 416*g* can identify the segment of track 402 between the virtual approach signal 412*c* and the intermediate signaling location 414*c*. The track section 416*h* can identify the segment of track 402 between the intermediate signaling location 414*c* and the virtual approach signal 412*d*. The track section 416*i* can identify the segment of track 402 between the virtual approach signal 412*d* and the second eastbound absolute signaling location 418. The track section 416*j* can identify the segment of track 402 between the second eastbound absolute signaling location 418 and a next segment of track not shown in FIG. 4A-4J.

The second eastbound absolute signaling location 418, in an embodiment, can indicate to the locomotive a status of the segment of track along the eastbound direction of the locomotive. For example, absolute signals can protect traffic operations and of a CTC interlocking from hazardous events and can be under direct control by the dispatcher. A CTC interlocking location is often referred to as a control point. The most restrictive indication from the absolute signal is "stop," because proceeding past the signal can result in the locomotive entering directly into a route of another locomotive. For example, the "stop" indicator can include a red signal or flashing red signal.

Figures 4A, 4B:
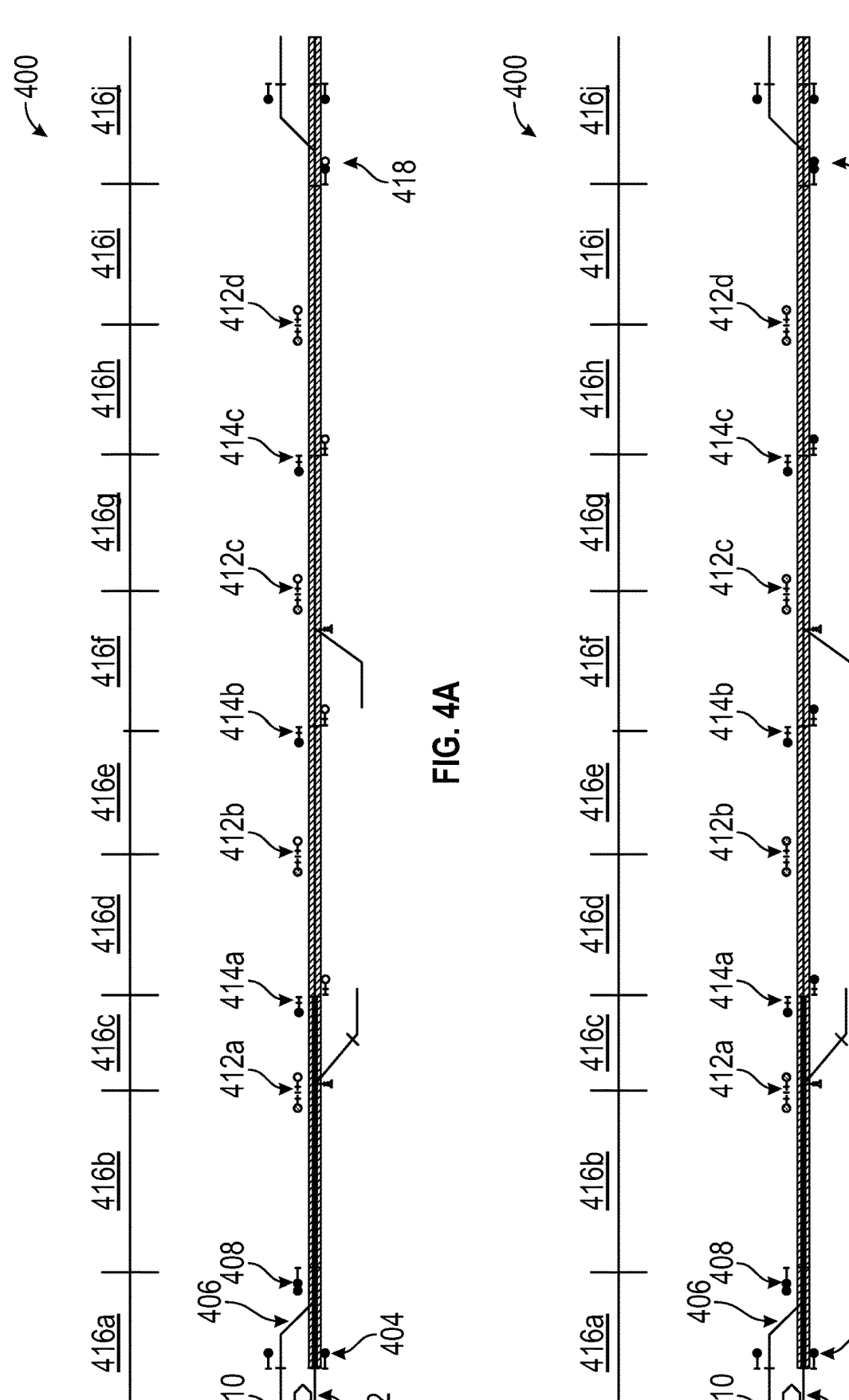
FIGS. 4A-4J illustrate a virtual approach signaling system, in accordance with one or more exemplary embodiments of the present disclosure.

Referring to FIG. 4A, the locomotive 410 can remain idle on the segment of track 402 within the track section 416*a* approaching the approach location 406 and the eastbound absolute signaling location 404. The locomotive 410 adheres to a PTC enforcement signal indicating for no locomotive to travel along the segment of track 402. In an example, the track sections 416*a*-416*j* can indicate no locomotive can travel within any of the sections. For example, the locomotive 410 remains idle at the approach location 406. In another example, the virtual approach signal 412*a-d* can indicate an all clear signal, contradicting the PTC enforcement signal. In this case, the locomotive 410 can adhere to the PTC enforcement signal as higher priority than the virtual approach signal 412*a-d*.

Referring to FIG. 4B, the locomotive 410 can remain idle on the segment of track 402 within the track section 416*a* remaining at the approach location 406 and the eastbound absolute signaling location 404. The locomotive 410 adheres to a PTC enforcement signal indicating for no locomotive to travel along the segment of track 402. In an example, the track sections 416*a*-416*j* can indicate no locomotive can travel within any of the sections. For example, the locomotive 410 remains idle at the approach location 406. In another example, the virtual approach signal 412*a-d* can indicate a restricted movement signal, contradicting the PTC enforcement signal. In this case, the locomotive 410 can adhere to the PTC enforcement signal as higher priority than the virtual approach signal 412*a-d*.

Figures 4C, 4D:
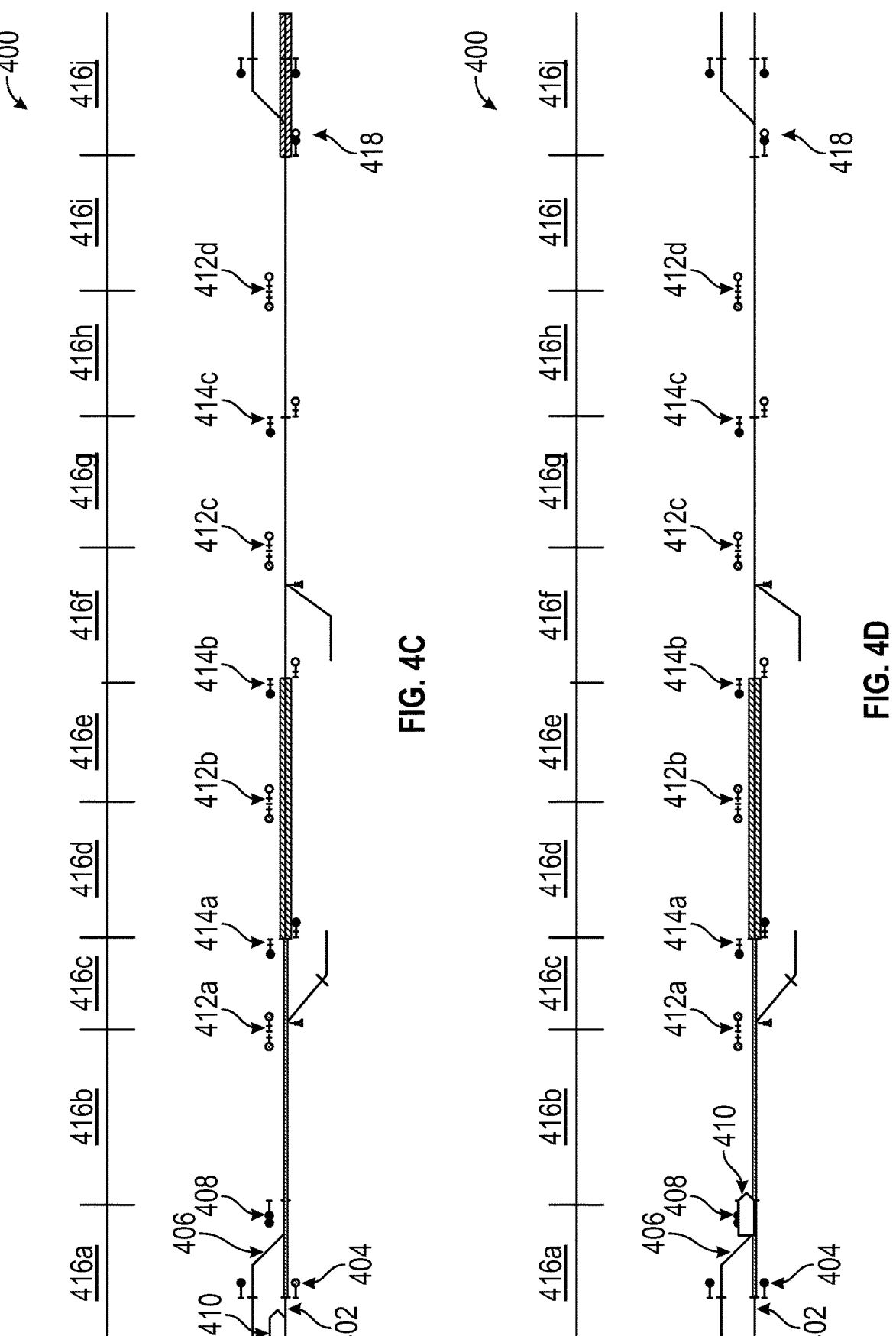

Referring to FIG. 4C, the locomotive 410 can remain idle on the segment of track 402 within the track section 416*a* remaining at the approach location 406 and the eastbound absolute signaling location 404. The locomotive 410 adheres to a PTC enforcement signal indicating for restricted travel along the segment of track 402. In an example, the track sections 416*a*-416*c* can indicate reduced speed within the track sections 416*a*-416*c*. For example, the locomotive 410 can begin to travel at a reduced speed starting at the track section 416*a*. In another example, the track sections 416*d*-416*e* can indicate an area including a PTC restriction fence. The PTC restriction fence can indicate any locomotive to enter the area must adhere to the PTC enforcement signal, which in this case, would be a restricted speed. In another example, the virtual approach signal 412*a* can indicate a reduced speed for the track section 416*a*-416*c*, aligning with the PTC enforcement signal. In this case, the locomotive 410 can adhere to the virtual approach signal 412*a* as the movement enforcement authority.

Referring to FIG. 4D, the locomotive 410 can embark from the approach location 406 within the track section 416*a* passing the eastbound absolute signaling location 404. The locomotive 410 can adhere to the virtual approach signal 412*a*. In an example, the track sections 416*a*-416*c* can indicate reduced speed within the track sections 416*a*-416*c*. For example, the locomotive 410 can begin to travel at a reduced speed through the track section 416*a*. In another example, the track sections 416*d*-416*e* can indicate an area including a PTC restriction fence. In another example, the virtual approach signal 412*a* can indicate a reduced speed for the track section 416*a*-416*c*, aligning with the PTC enforcement signal. In this case, the locomotive 410 can adhere to the virtual approach signal 412*a* as the movement enforcement authority.

Figures 4E, 4F:
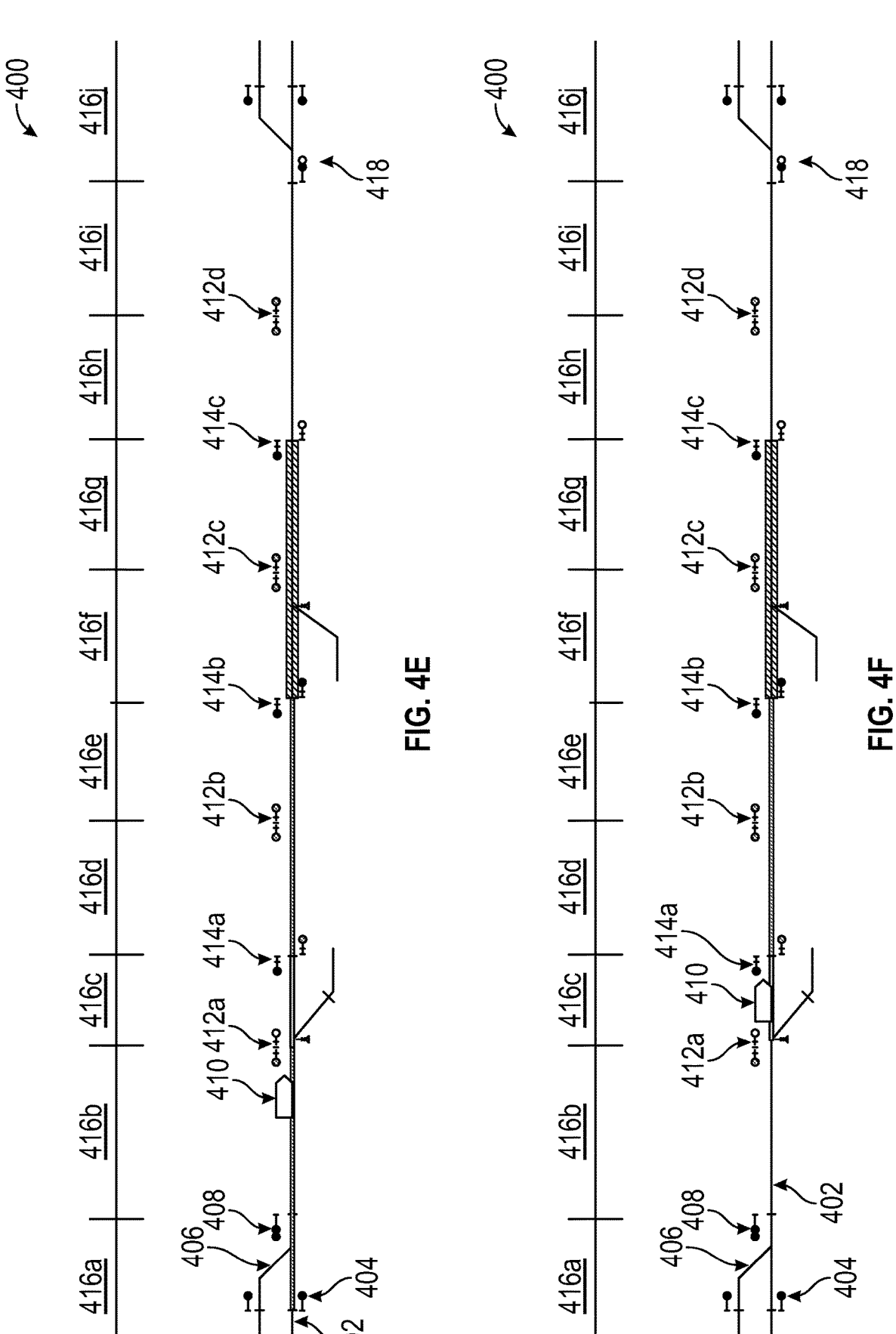

Referring to FIG. 4E, the locomotive 410 can travel from the approach location 406 within the track section 416*b* approaching the virtual approach signal 412*a*. The locomotive 410 can adhere to the virtual approach signal 412*a*. In an example, the virtual approach signal 412*a* can indicate an all clear signal allowing the locomotive 410 to travel at full speed for the track section 416*c*. For example, the locomotive 410 can begin to travel at a reduced speed from the track section 416*a*, but can increase to full speed based on the virtual approach signal 412*a*. In another example, the track sections 416*d*-416*e* can indicate an area including a reduced speed. In an example, the track sections 416*f*-416*g* can include a PTC restriction fence. In this case, the locomotive 410 can adhere to the virtual approach signal 412*a* as the movement enforcement authority for the preceding section of track.

Referring to FIG. 4F, the locomotive 410 can travel from the virtual approach signal 412*a* within the track section 416*c* approaching the intermediate signaling location 414*a*. The locomotive 410 can adhere to the intermediate signaling location 414*a*. In an example, the intermediate signaling location 414*a* can indicate a reduced speed restricting the locomotive 410 to travel at reduced speed for the track section 416*d*-416*e*. For example, the locomotive 410 can begin to travel at a full speed from the track section 416*c*, but can reduce speed based on the intermediate signaling location 414*a*. In another example, the track sections 416*f*-416*g* can include a PTC restriction fence. In this case, the locomotive 410 can adhere to the intermediate signaling location 414*a* as the movement enforcement authority for the preceding section of track.

Figures 4G, 4H:
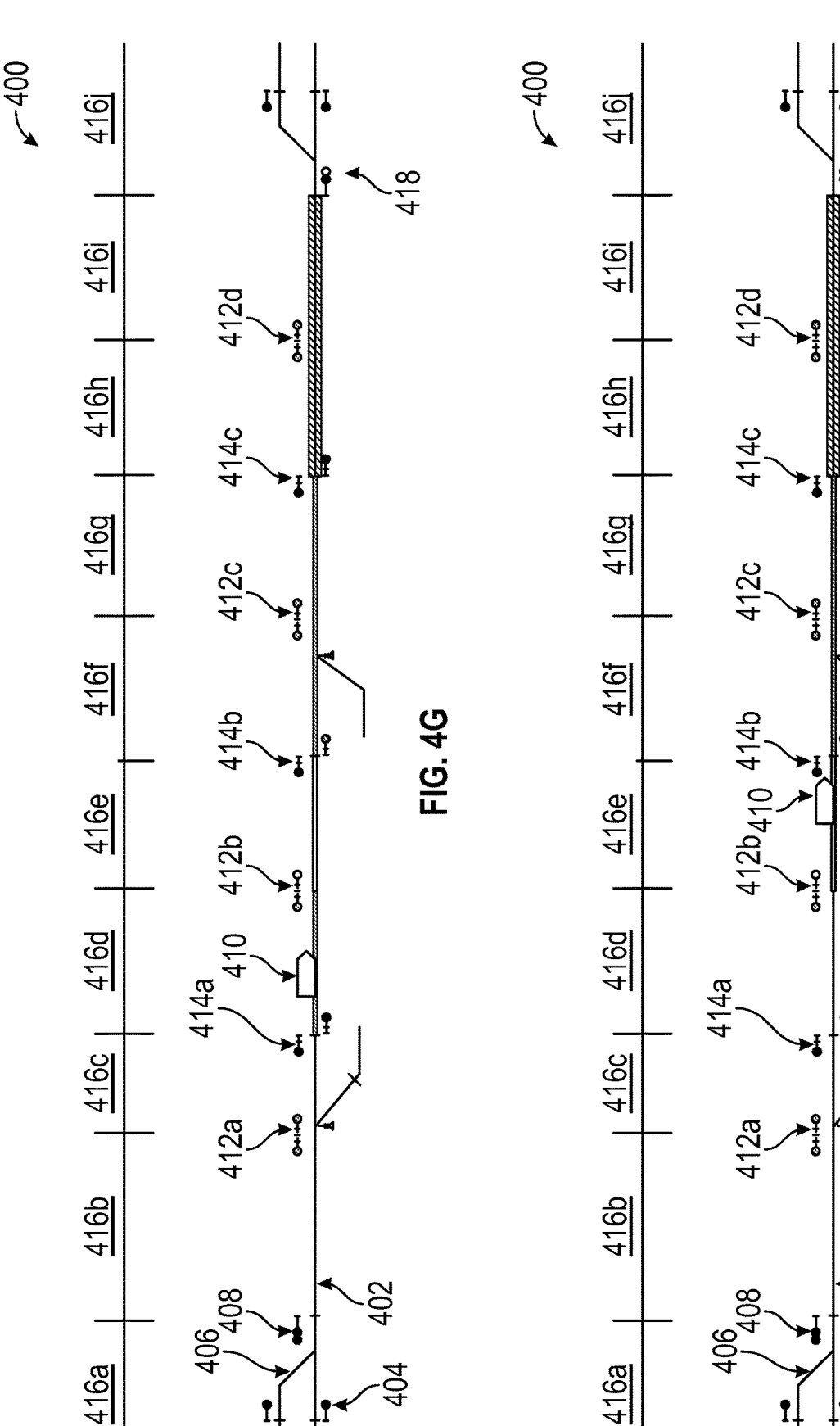

Referring to FIG. 4G, the locomotive 410 can travel from the intermediate signaling location 414*a* within the track section 416*d* approaching the virtual approach signal 412*b*. The locomotive 410 can adhere to the intermediate signaling location 414*a* while in track section 416*d*. In an example, the virtual approach signal 412*b* can indicate an all clear signal allowing the locomotive 410 to travel at full speed for the track section 416*e*. For example, the locomotive 410 can begin to travel at a reduced speed from the track section 416*d*, but can increase to full speed based on the virtual approach signal 412*e*. In another example, the track sections 416*f*-416*g* can indicate an area including a reduced speed. In an example, the track sections 416*h*-416*i* can include a PTC restriction fence. In this case, the locomotive 410 can adhere to the virtual approach signal 412*b* as the movement enforcement authority for the preceding section of track.

Referring to FIG. 4H, the locomotive 410 can travel from the virtual approach signal 412*b* within the track section 416*e* approaching the intermediate signaling location 414*b*. The locomotive 410 can adhere to the virtual approach signal 414*b* while in track section 416*e*. In an example, the intermediate signaling location 414*b* can indicate a reduced speed restricting the locomotive 410 to travel at reduced speed for the track section 416*f*. For example, the locomotive 410 can begin to travel at a full speed from the track section 416*e*, but can reduce speed based on the intermediate signaling location 414*b*. In another example, the track sections 416*h*-416*i* can include a PTC restriction fence. In this case, the locomotive 410 can adhere to the intermediate signaling location 414*b* as the movement enforcement authority for the preceding section of track.

Figures 4I, 4J:
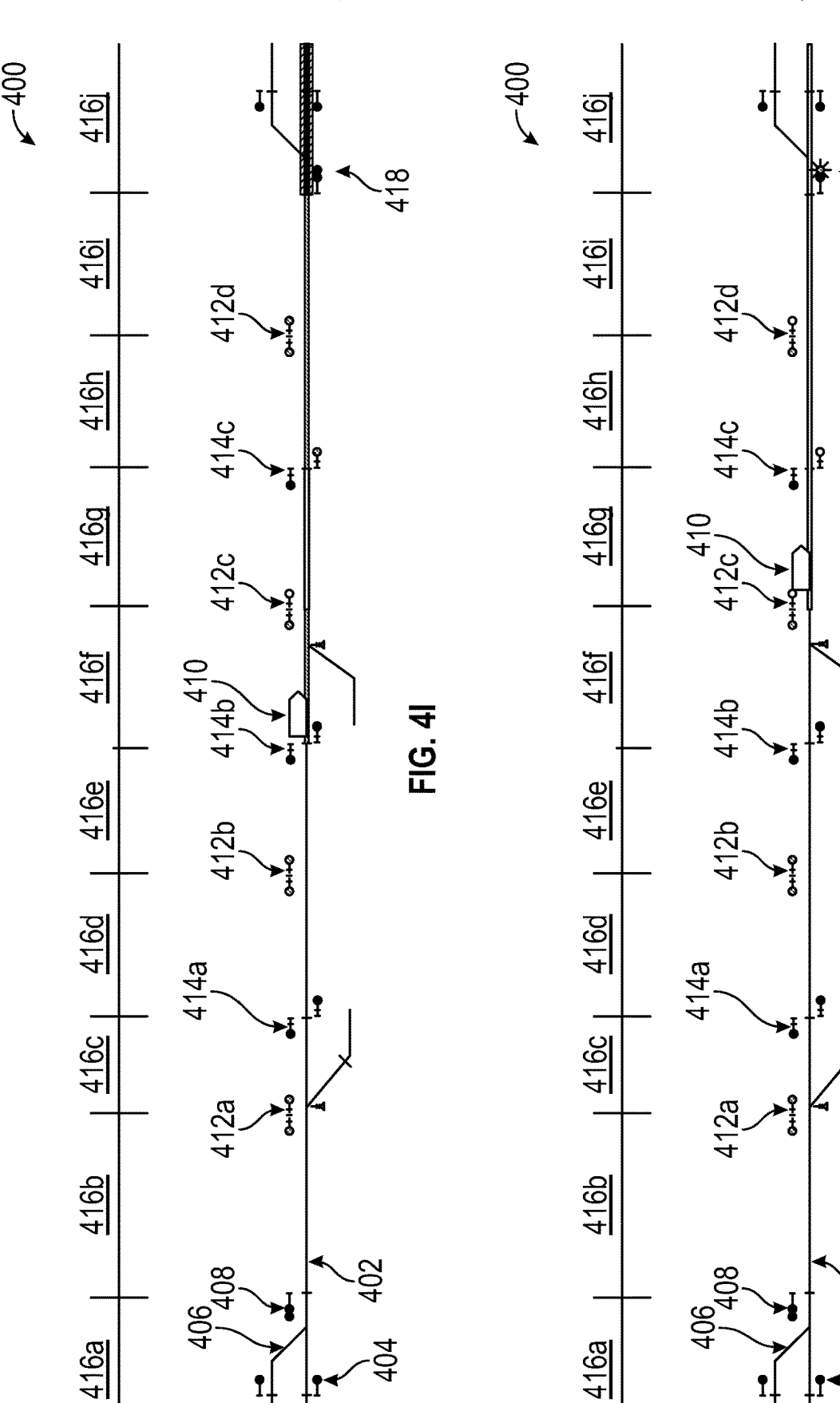

Referring to FIG. 4I, the locomotive 410 can travel from the intermediate signaling location 414*b* within the track section 416*f* approaching the virtual approach signal 412*c*. The locomotive 410 can adhere to the intermediate signaling location 414*b* while in track section 416*f*. In an example, the virtual approach signal 412*c* can indicate an all clear signal allowing the locomotive 410 to travel at full speed for the track section 416*g*. For example, the locomotive 410 can begin to travel at a reduced speed from the track section 416*f*, but can increase to full speed based on the virtual approach signal 412*g*. In another example, the track sections 416*h*-416*i* can indicate an area including a reduced speed. In an example, the track section 416*j* can include a PTC restriction fence indicating no locomotives allowed to travel along the segment of track 402. In this case, the locomotive

410 can adhere to the virtual approach signal 412*c* as the movement enforcement authority for the preceding section of track.

Referring to FIG. 4J, the locomotive 410 can travel from the virtual approach signal 412*c* within the track section 416*g* approaching the intermediate signaling location 414*c*. The locomotive 410 can adhere to the virtual approach signal 414*c* while in track section 416*g*. In an example, the intermediate signaling location 414*c* can indicate a full speed allowing the locomotive 410 to travel at full speed for the track sections 416*f*-416*j*. For example, the locomotive 410 can begin to travel at a full speed from the track section 416*g*, and remain at full speed based on the intermediate signaling location 414*c*.

FIG. 5 illustrates a flowchart exemplifying a process for virtual approach signaling 500, in accordance with at least one embodiment of the present disclosure. The process for virtual approach signaling 500 can be implemented as an algorithm on a computer processor (e.g., logic controller, onboard computer, PTC onboard terminal, server, etc.), a machine learning module, or other suitable system. Additionally, the process for virtual approach signaling 500 can be achieved with software, hardware, an API, a network connection, a network transfer protocol, HTML, DHTML, JavaScript, Dojo, Ruby, Rails, other suitable applications, or a suitable combination thereof. The process for virtual approach signaling 500 implementing hardware components (e.g., computer processor) can be capable of executing machine-readable instructions to perform program steps and operably coupled to a memory having a first database with a plurality of messages, signal values, and specifications related to a vehicle and at least a portion of a track.

The process for virtual approach signaling 500 can leverage the ability of a computer platform to spawn multiple processes and threads by processing data simultaneously. The speed and efficiency of the process for virtual approach signaling 500 can be greatly improved by instantiating more than one process for responding to a track hazard. However, one skilled in the art of programming will appreciate that use of a single processing thread may also be utilized and is within the scope of the present disclosure. The process for virtual approach signaling 500 can also be distributed amongst a plurality of networked computer processors. The computer processors can be located in wayside systems or onboard the train (e.g., 110, 210, 310, 410, etc.). The process for virtual approach signaling 500 of the present embodiment begins at step 502.

At step 502, in an embodiment, the process 500 can enable a locomotive to pass an approach location corresponding to absolute signals indicating the locomotive can pass without restriction. For example, the approach locations can include physical signal components indicating to a locomotive on a segment of track the next segment of track is clear. In an example, the physical signal components can include various colored lights either solid in color or flashing. In another example, the various colored lights can include green, yellow, or red. In an example, the restriction can include railway events resulting in an impasse along the segment of track. For example, the restriction can include a broken rail along the segment of track, or the segment of track includes another locomotive rendering the track occupied. In another example, the absolute signal can include signal indicators for which the locomotive operator can adhere. For example, the absolute signals can include signal indicators as a flashing red indicator, where the locomotive operator will stop the locomotive on the segment of track and avoid passing the approach location. The process 500 then proceeds to step 504.

At step 504, in an embodiment, the process 500 can include virtual approach signal located anywhere in a segment of track (i.e., the block). For example, the virtual approach signal can reside at any location along the segment of track. In an example, the process 500 can include a plurality of virtual approach signals located anywhere in the segment of track. In another example, when a single virtual approach signal is along the segment of track, the location of the virtual approach signal can be different for an eastbound direction of travel and a westbound direction of travel. Each direction can include defined enforcement limits. In an example, the location of the virtual approach signal is based on geolocation data. In another example, the geolocation data can include GPS data or GIS data. The location of the virtual approach signal can be based on input from a PTC coordinator, such as a railway organization. The virtual approach signal or signals can be based on an optimization metric set by the PTC coordinator. The optimization metric can be based on the use of the segment of track. For example, when the segment of track is used for passenger travels, the optimization metric can include a minimum number of virtual approach signals to adhere to stricter safety regulations. Alternatively, when the segment of track is used for cargo transportation, the optimization metric can include a maximum number of virtual approach signals to ensure rapid transit. The process 500 then proceeds to step 506.

At step 506, in an embodiment, the process 500 can include the locomotive approaching the location of the virtual approach signal along the segment of track. For example, the locomotive can receive a signal from a nearest wayside system indicating a position of the virtual approach signal along the segment of track. The locomotive can display the position of the virtual approach signal along the segment of track on a display of a PTC onboard terminal within the locomotive. The PTC onboard terminal can display a relative position of the locomotive along the segment of track and display positions of the virtual approach signals along the segment of track. The PTC onboard terminal can display the signal indicators of the virtual approach signals indicating whether the virtual approach signals are allowing travel at full speed or restricted speed. The process 500 then proceeds to step 508.

At step 508, in an embodiment, the process 500 can include the locomotive identifying the signal indication of the virtual approach signal or signals. For example, the virtual approach signal can indicate various statuses of the next segment of track. In an example, the virtual approach signal can include a first approach indicator and a second approach indicator. The first approach indicator can include a restricted speed requirement along the next segment of track, until the locomotive reaches the next virtual approach signal. The second approach indicator can include a full speed indicator along the next segment of track, until the locomotive reaches the next virtual approach signal. In an example, the next segment of track can correspond to a distance between two virtual approach signals, a distance between an absolute signal and a virtual approach signal, a distance between an intermediate signal and a virtual approach signal, or any combination thereof. The process 500 then proceeds to step 510.

At step 510, in an embodiment, the process 500 can determine a number of virtual approach signals. For example, the process 500 can receive a signal from the wayside system indicating positions of the virtual approach signals. In an example, the wayside system can communicate a total number of virtual approach signals to the locomotive. In another example, hardware in the locomotive can identify the total number of virtual approach signals along the segment of track. The locomotive can identify the total number of virtual approach signals by assigning a value to each of the virtual approach signals and accumulating the value of each of the virtual approach signals. In an example, the value assigned to each of the virtual approach signals is one. If the total number of virtual approach signals is one, the process 500 then proceeds to step 514. If the total number of virtual approach signals is many, the process 500 then proceeds to step 512.

At step 512, in an embodiment, the process 500 can include every virtual approach signal displaying the same indication no matter where the train is located within the block. For example, each of the virtual approach signals will indicate a same indicator regardless of position along the segment of track. In an example, each of the virtual approach signals can indicate a yellow indicator, resulting in the locomotive reducing its speed to a restricted speed. In another example, each of the virtual approach signals can indicate a green indicator, resulting in the locomotive traveling at full speed. In an example, protection for the rear of the train would be provided by the approach location. For example, if the locomotive travels past the approach location at a first time, and another locomotive reaches the approach location at a second time, the wayside system can identify whether a difference between the first time and the second time allows for the locomotive to safely travel along the segment of track. In another example, the approach location can include either an intermediate signal location or an absolute signal location.

At step 514, in an embodiment, the process 500 can include the location of the virtual approach signals can be different for eastbound and westbound directions. In an example, each direction will have defined enforcement limits.

FIG. 6 illustrates a flowchart exemplifying a process for virtual approach signaling 600, in accordance with at least one embodiment of the present disclosure. The process for virtual approach signaling 600 can be implemented as an algorithm on a computer processor (e.g., logic controller, onboard computer, PTC onboard terminal, server, etc.), a machine learning module, or other suitable system. Additionally, the process for virtual approach signaling 600 can be achieved with software, hardware, an API, a network connection, a network transfer protocol, HTML, DHTML, JavaScript, Dojo, Ruby, Rails, other suitable applications, or a suitable combination thereof. The process for virtual approach signaling 600 implementing hardware components (e.g., computer processor) can be capable of executing machine-readable instructions to perform program steps and operably coupled to a memory having a first database with a plurality of messages, signal values, and specifications related to a vehicle and at least a portion of a track.

The process for virtual approach signaling 600 can leverage the ability of a computer platform to spawn multiple processes and threads by processing data simultaneously. The speed and efficiency of the process for virtual approach signaling 600 can be greatly improved by instantiating more than one process for responding to a track hazard. However, one skilled in the art of programming will appreciate that use of a single processing thread may also be utilized and is within the scope of the present disclosure. The process for virtual approach signaling 600 can also be distributed amongst a plurality of networked computer processors. The computer processors can be located in wayside systems or onboard the train (e.g., 110, 210, 310, 410, etc.). The process for virtual approach signaling 600 of the present embodiment begins at step 602.

At step 602, in an embodiment, the process 600 can enable a locomotive to pass an approach location corresponding to absolute signals indicating the locomotive can pass without restriction. For example, the approach locations can include physical signal components indicating to a locomotive on a segment of track the next segment of track is clear. In an example, the physical signal components can include various colored lights either solid in color or flashing. In another example, the various colored lights can include green, yellow, or red. In an example, the restriction can include railway events resulting in an impasse along the segment of track. For example, the restriction can include a broken rail along the segment of track, or the segment of track includes another locomotive rendering the track occupied. In another example, the absolute signal can include signal indicators for which the locomotive operator can adhere. For example, the absolute signals can include signal indicators as a flashing red indicator, where the locomotive operator will stop the locomotive on the segment of track and avoid passing the approach location. The process 600 then proceeds to step 604.

At step 604, in an embodiment, the process 600 can include virtual approach signal located anywhere in a segment of track (i.e., the block). For example, the virtual approach signal can reside at any location along the segment of track. In an example, the process 600 can include a plurality of virtual approach signals located anywhere in the segment of track. In another example, when a single virtual approach signal is along the segment of track, the location of the virtual approach signal can be different for an eastbound direction of travel and a westbound direction of travel. Each direction can include defined enforcement limits. In an example, the location of the virtual approach signal is based on geolocation data. In another example, the geolocation data can include GPS data or GIS data. The location of the virtual approach signal can be based on input from a PTC coordinator, such as a railway organization. The virtual approach signal or signals can be based on an optimization metric set by the PTC coordinator. The optimization metric can be based on the use of the segment of track. For example, when the segment of track is used for passenger travels, the optimization metric can include a minimum number of virtual approach signals to adhere to stricter safety regulations. Alternatively, when the segment of track is used for cargo transportation, the optimization metric can include a maximum number of virtual approach signals to ensure rapid transit. The process 600 then proceeds to step 606.

At step 606, in an embodiment, the process 600 can include the locomotive approaching the location of the virtual approach signal along the segment of track. For example, the locomotive can receive a signal from a nearest wayside system indicating a position of the virtual approach signal along the segment of track. The locomotive can display the position of the virtual approach signal along the segment of track on a display of a PTC onboard terminal within the locomotive. The PTC onboard terminal can display a relative position of the locomotive along the segment of track and display positions of the virtual approach signals along the segment of track. The PTC onboard terminal can display the signal indicators of the virtual approach signals indicating whether the virtual approach signals are allowing travel at full speed or restricted speed. The process 600 then proceeds to step 608.

At step 608, in an embodiment, the process 600 can include the locomotive identifying the signal indication of the virtual approach signal or signals. For example, the virtual approach signal can indicate various statuses of the next segment of track. In an example, the virtual approach signal can include a first approach indicator and a second approach indicator. The first approach indicator can include a restricted speed requirement along the next segment of track, until the locomotive reaches the next virtual approach signal. The second approach indicator can include a full speed indicator along the next segment of track, until the locomotive reaches the next virtual approach signal. In an example, the next segment of track can correspond to a distance between two virtual approach signals, a distance between an absolute signal and a virtual approach signal, a distance between an intermediate signal and a virtual approach signal, or any combination thereof. The process 600 then proceeds to step 610.

At step 610, in an embodiment, the process 600 can determine what are the signal colors of the physical signaling components. If the colors include yellow, flashing yellow, or green, the process 600 then proceeds to step 614. If the colors include red or flashing red, the process 600 then proceeds to step 612.

At step 612, in an embodiment, the process 600 can include the virtual approach signal indication is an approach. In an example, the approach can include a PTC yellow line.

At step 614, in an embodiment, the process 600 can include signal indications at the signal location to drive a clear virtual approach signal. In an example, the clear can include a PTC green line.

FIG. 7 illustrates a flowchart exemplifying a process for virtual approach signaling 700, in accordance with at least one embodiment of the present disclosure. The process for virtual approach signaling 700 can be implemented as an algorithm on a computer processor (e.g., logic controller, onboard computer, PTC onboard terminal, server, etc.), a machine learning module, or other suitable system. Additionally, the process for virtual approach signaling 700 can be achieved with software, hardware, an API, a network connection, a network transfer protocol, HTML, DHTML, JavaScript, Dojo, Ruby, Rails, other suitable applications, or a suitable combination thereof. The process for virtual approach signaling 700 implementing hardware components (e.g., computer processor) can be capable of executing machine-readable instructions to perform program steps and operably coupled to a memory having a first database with a plurality of messages, signal values, and specifications related to a vehicle and at least a portion of a track.

The process for virtual approach signaling 700 can leverage the ability of a computer platform to spawn multiple processes and threads by processing data simultaneously. The speed and efficiency of the process for virtual approach signaling 700 can be greatly improved by instantiating more than one process for responding to a track hazard. However, one skilled in the art of programming will appreciate that use of a single processing thread may also be utilized and is within the scope of the present disclosure. The process for virtual approach signaling 700 can also be distributed amongst a plurality of networked computer processors. The computer processors can be located in wayside systems or onboard the train (e.g., 110, 210, 310, 410, etc.). The process for virtual approach signaling 700 of the present embodiment begins at step 702.

At step 702, in an embodiment, the process 700 can enable a locomotive to pass an approach location corresponding to absolute signals indicating the locomotive can pass without restriction. For example, the approach locations can include physical signal components indicating to a locomotive on a segment of track the next segment of track is clear. In an example, the physical signal components can include various colored lights either solid in color or flashing. In another example, the various colored lights can include green, yellow, or red. In an example, the restriction can include railway events resulting in an impasse along the segment of track. For example, the restriction can include a broken rail along the segment of track, or the segment of track includes another locomotive rendering the track occupied. In another example, the absolute signal can include signal indicators for which the locomotive operator can adhere. For example, the absolute signals can include signal indicators as a flashing red indicator, where the locomotive operator will stop the locomotive on the segment of track and avoid passing the approach location. The process 700 then proceeds to step 704.

At step 704, in an embodiment, the process 700 can include virtual approach signal located anywhere in a segment of track (i.e., the block). For example, the virtual approach signal can reside at any location along the segment of track. In an example, the process 700 can include a plurality of virtual approach signals located anywhere in the segment of track. In another example, when a single virtual approach signal is along the segment of track, the location of the virtual approach signal can be different for an eastbound direction of travel and a westbound direction of travel. Each direction can include defined enforcement limits. In an example, the location of the virtual approach signal is based on geolocation data. In another example, the geolocation data can include GPS data or GIS data. The location of the virtual approach signal can be based on input from a PTC coordinator, such as a railway organization. The virtual approach signal or signals can be based on an optimization metric set by the PTC coordinator. The optimization metric can be based on the use of the segment of track. For example, when the segment of track is used for passenger travels, the optimization metric can include a minimum number of virtual approach signals to adhere to stricter safety regulations. Alternatively, when the segment of track is used for cargo transportation, the optimization metric can include a maximum number of virtual approach signals to ensure rapid transit. The process 700 then proceeds to step 706.

At step 706, in an embodiment, the process 700 can include the locomotive approaching the location of the virtual approach signal along the segment of track. For example, the locomotive can receive a signal from a nearest wayside system indicating a position of the virtual approach signal along the segment of track. The locomotive can display the position of the virtual approach signal along the segment of track on a display of a PTC onboard terminal within the locomotive. The PTC onboard terminal can display a relative position of the locomotive along the segment of track and display positions of the virtual approach signals along the segment of track. The PTC onboard terminal can display the signal indicators of the virtual approach signals indicating whether the virtual approach signals are allowing travel at full speed or restricted speed. The process 700 then proceeds to step 708.

At step 708, in an embodiment, the process 700 can include the locomotive identifying the signal indication of the virtual approach signal or signals. For example, the virtual approach signal can indicate various statuses of the next segment of track. In an example, the virtual approach signal can include a first approach indicator and a second approach indicator. The first approach indicator can include a restricted speed requirement along the next segment of track, until the locomotive reaches the next virtual approach signal. The second approach indicator can include a full speed indicator along the next segment of track, until the locomotive reaches the next virtual approach signal. In an example, the next segment of track can correspond to a distance between two virtual approach signals, a distance between an absolute signal and a virtual approach signal, a distance between an intermediate signal and a virtual approach signal, or any combination thereof. The process 700 then proceeds to step 710.

At step 710, in an embodiment, the process 700 can include a track circuit. For example, the track circuit can indicate the segment of track includes a restricting fence. In another example, the track circuit PTC device types are used at the approach location to give a restricting fence over the entire segment of track. The restricting fence blocks the ability of the virtual approach signals to upgrade or downgrade the locomotive speed. In an example, the restricting fence cannot be overcome using conventional approaches found in the present disclosure. In an example, the restricting fence can include a PTC yellow fence. The PTC yellow fence can result in the locomotive traveling at a reduced speed along the entire segment of track, until the locomotive reaches a next intermediate or absolute signal. In another example, the restricting fence can include a PTC red fence. The PTC red fence can result in the locomotive stopping at the approach location until the locomotive receives a signal indicating the locomotive can safely proceed along the segment of track.

FIG. 8 illustrates a flowchart exemplifying a process for virtual approach signaling 800, in accordance with at least one embodiment of the present disclosure. The process for virtual approach signaling 800 can be implemented as an algorithm on a computer processor (e.g., logic controller, onboard computer, PTC onboard terminal, server, etc.), a machine learning module, or other suitable system. Additionally, the process for virtual approach signaling 800 can be achieved with software, hardware, an API, a network connection, a network transfer protocol, HTML, DHTML, JavaScript, Dojo, Ruby, Rails, other suitable applications, or a suitable combination thereof. The process for virtual approach signaling 800 implementing hardware components (e.g., computer processor) can be capable of executing machine-readable instructions to perform program steps and operably coupled to a memory having a first database with a plurality of messages, signal values, and specifications related to a vehicle and at least a portion of a track.

The process for virtual approach signaling 800 can leverage the ability of a computer platform to spawn multiple processes and threads by processing data simultaneously. The speed and efficiency of the process for virtual approach signaling 800 can be greatly improved by instantiating more than one process for responding to a track hazard. However, one skilled in the art of programming will appreciate that use of a single processing thread may also be utilized and is within the scope of the present disclosure. The process for virtual approach signaling 800 can also be distributed amongst a plurality of networked computer processors. The computer processors can be located in wayside systems or onboard the train (e.g., 110, 210, 310, 410, etc.). The process for virtual approach signaling 800 of the present embodiment begins at step 802.

At step 802, in an embodiment, the process 800 can enable a locomotive to pass an approach location corresponding to absolute signals indicating the locomotive can pass without restriction. For example, the approach locations can include physical signal components indicating to a locomotive on a segment of track the next segment of track is clear. In an example, the physical signal components can include various colored lights either solid in color or flashing. In another example, the various colored lights can include green, yellow, or red. In an example, the restriction can include railway events resulting in an impasse along the segment of track. For example, the restriction can include a broken rail along the segment of track, or the segment of track includes another locomotive rendering the track occupied. In another example, the absolute signal can include signal indicators for which the locomotive operator can adhere. For example, the absolute signals can include signal indicators as a flashing red indicator, where the locomotive operator will stop the locomotive on the segment of track and avoid passing the approach location. The process 800 then proceeds to step 804.

At step 804, in an embodiment, the process 800 can include virtual approach signal located anywhere in a segment of track (i.e., the block). For example, the virtual approach signal can reside at any location along the segment of track. In an example, the process 800 can include a plurality of virtual approach signals located anywhere in the segment of track. In another example, when a single virtual approach signal is along the segment of track, the location of the virtual approach signal can be different for an eastbound direction of travel and a westbound direction of travel. Each direction can include defined enforcement limits. In an example, the location of the virtual approach signal is based on geolocation data. In another example, the geolocation data can include GPS data or GIS data. The location of the virtual approach signal can be based on input from a PTC coordinator, such as a railway organization. The virtual approach signal or signals can be based on an optimization metric set by the PTC coordinator. The optimization metric can be based on the use of the segment of track. For example, when the segment of track is used for passenger travels, the optimization metric can include a minimum number of virtual approach signals to adhere to stricter safety regulations. Alternatively, when the segment of track is used for cargo transportation, the optimization metric can include a maximum number of virtual approach signals to ensure rapid transit. The process 800 then proceeds to step 806.

At step 806, in an embodiment, the process 800 can include the locomotive approaching the location of the virtual approach signal along the segment of track. For example, the locomotive can receive a signal from a nearest wayside system indicating a position of the virtual approach signal along the segment of track. The locomotive can display the position of the virtual approach signal along the segment of track on a display of a PTC onboard terminal within the locomotive. The PTC onboard terminal can display a relative position of the locomotive along the segment of track and display positions of the virtual approach signals along the segment of track. The PTC onboard terminal can display the signal indicators of the virtual approach signals indicating whether the virtual approach signals are allowing travel at full speed or restricted speed. The process 800 then proceeds to step 808.

At step 808, in an embodiment, the process 800 can include the locomotive identifying the signal indication of the virtual approach signal or signals. For example, the virtual approach signal can indicate various statuses of the next segment of track. In an example, the virtual approach signal can include a first approach indicator and a second approach indicator. The first approach indicator can include a restricted speed requirement along the next segment of track, until the locomotive reaches the next virtual approach signal. The second approach indicator can include a full speed indicator along the next segment of track, until the locomotive reaches the next virtual approach signal. In an example, the next segment of track can correspond to a distance between two virtual approach signals, a distance between an absolute signal and a virtual approach signal, a distance between an intermediate signal and a virtual approach signal, or any combination thereof. The process 800 then proceeds to step 810.

At step 810, in an embodiment, the process 800 can include identifiable signs in the field can indicate the location or locations of the virtual approach signals. For example, the segment of track can include the signs. In an example, the signs can include hardware components storing geolocation data to identify the location along the segment of track. The geolocation data can include GPS data, GIS data, milepost data, latitude-longitude coordinates, or any other identifiable geolocation data. The process 800 then proceeds to step 812.

At step 812, in an embodiment, the process 800 can include a crew arriving to the sign rather than wait at an intermediate location.

Figure 9B:
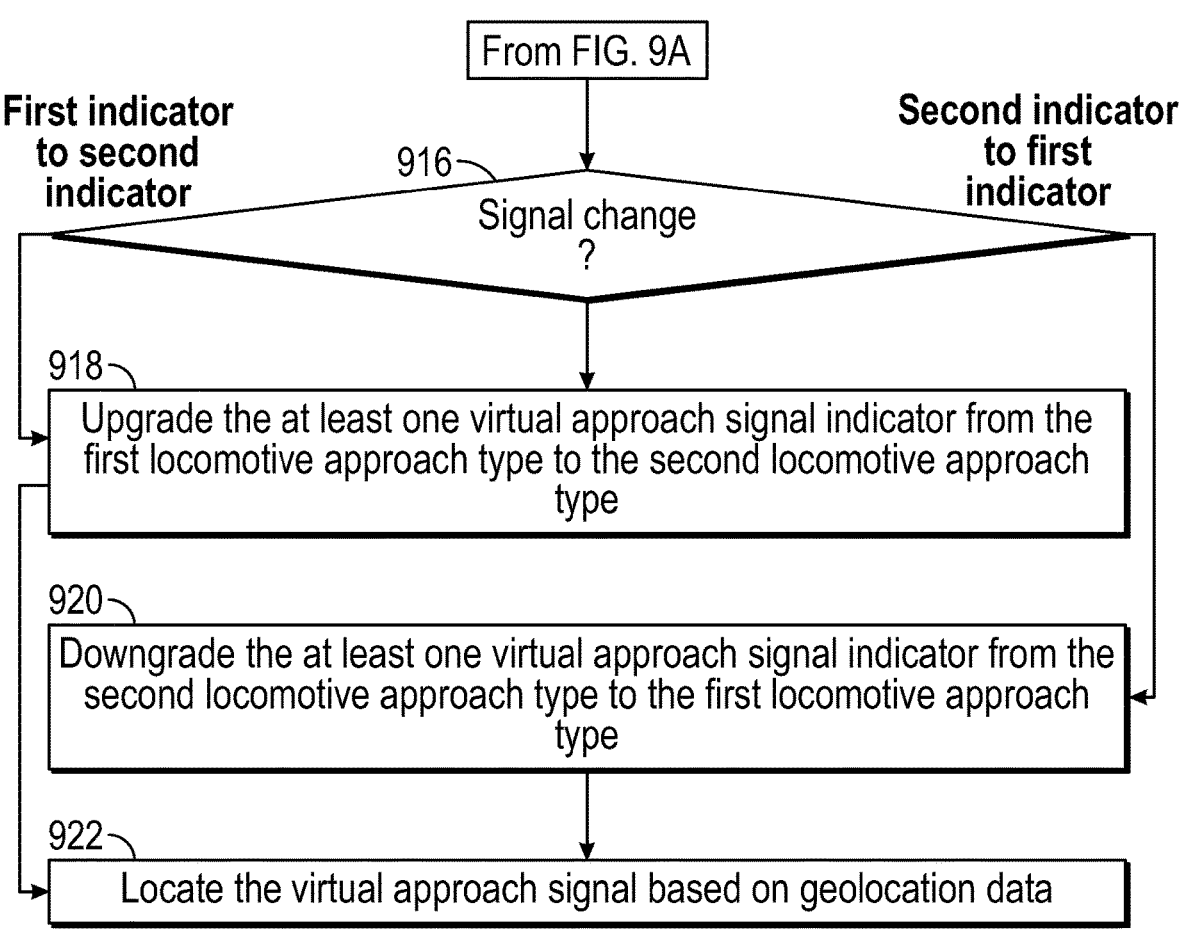

FIGS. 9A and 9B illustrate a flowchart exemplifying virtual approach signaling control logic 900, in accordance with one or more exemplary embodiments of the present disclosure. The virtual approach signaling control logic 900 can be implemented as an algorithm on a computer processor (e.g., a wayside system including a PTC onboard computer, a wayside system including a PTC onboard computer and a processor, a processor, a PTC onboard computer, a server, etc.), a machine learning module, or other suitable system. Additionally, the virtual approach signaling control logic 900 can be achieved with software, firmware, hardware, an API, a network connection, a network transfer protocol, HTML, DHTML, JavaScript, Dojo, Ruby, Rails, other suitable applications, or a suitable combination thereof. The virtual approach signaling control logic 900 (e.g., computer processor) can be capable of executing machine-readable instructions to perform program steps and operably coupled to a memory having a first database with a plurality of messages, signal values, and specifications related to a vehicle and at least a portion of a track.

The virtual approach signaling control logic 900 can leverage the ability of a computer platform to spawn multiple processes and threads by processing data simultaneously. In an embodiment, the virtual approach signaling control logic 900 can be implemented using a wayside system including a PTC onboard computer and processor. For example, the wayside system can communicate the signaling aspects of the absolute, intermediate, and virtual approach signals to the locomotives along the segment of track. In an example, the PTC onboard computer and the processor of the wayside system can execute instructions to perform the virtual approach signaling control logic 900. The wayside system can transmit communication signals using the PTC onboard computer and the processor. The speed and efficiency of the virtual approach signaling control logic 900 can be greatly improved by instantiating more than one process to implement a virtual approach signaling. However, one skilled in the art of programming will appreciate that use of a single processing thread may also be utilized and is within the scope of the present disclosure. The virtual approach signaling control logic 900 can also be distributed amongst a plurality of networked computer processors. The computer processors can be located in a wayside system or onboard a locomotive. The virtual approach signaling control logic 900 process flow of the present embodiment begins at step 902.

At step 902, in an embodiment, the control logic 900 can receive a PTC advancement signal corresponding to a signal location. For example, the control logic 900 can receive the PTC advancement signal from a CTC system. In an example, the PTC advancement signal can include a wireless communication signal such as an electromagnetic signal transmitted over-the-air. In another example, the CTC system can control locomotive traffic along the segment of track. In another example, the control logic 900 can receive the PTC advancement signal using wireless communication hardware of the locomotive. For example, the control logic 900 can control the wireless communication hardware to receive the PTC advancement signal and convert the PTC advancement signal into digital format. In another example, the signal location can include physical hardware used to provide physical signaling components such as lighting elements, electronic circuitry, audio circuitry, or other types of physical signaling components. For example, the signal location can include an absolute signal or an intermediate signal. In another example, the locomotive can receive the PTC advancement signal using a PTC onboard terminal. The control logic 900 then proceeds to step 904.

At step 904, in an embodiment, the control logic 900 can determine whether the PTC advancement signal indicates a first advancement indicator or a second advancement indicator. For example, the control logic 900 can convert the PTC advancement signal into digital format as machine-readable information and parse the information. The control logic 900 can search the information for an identifiable variable indicating a type of advancement indicator from the PTC advancement signal. In another example, the first advancement indicator can include a red signal indicator or a flashing red signal indicator. In another example, the second advancement indicator can include a yellow signal indicator, a flashing yellow signal indicator, or a green signal indicator. The control logic 900 then proceeds to step 906.

At step 906, in an embodiment, the control logic 900 can determine a signal identifier based on the information from the PTC advancement signal. For example, the control logic 900 can parse the information of the PTC advancement signal to identify a variable of the information as the advancement indicator and store the variable locally. The PTC advancement signal can correspond with an indicator from the physical signaling components indicating whether a locomotive can safely travel along the segment of track. If the signal identifier is the first signal indicator, the control logic 900 then proceeds to step 908. If the signal identifier is the second signal indicator, the control logic 900 then proceeds to step 910.

At step 908, in an embodiment, the control logic 900 can generate at least one virtual approach signal indicator including a first locomotive approach type. For example, the virtual approach signal indicator can include digitally generated indicators to display on the PTC onboard terminal. For example, the PTC onboard terminal can include a digital representation of the segment of track including the various absolute signals and intermediate signals. The PTC onboard terminal can include the virtual approach signal indicator as a signaling component between physical signaling components. The virtual approach signal indicator can indicate signal identifiers corresponding to the signal location. For example, if the signal location includes a red signal indicator or flashing red signal indicator, the virtual approach signal indicator can include a yellow signal indicator. The yellow signal indicator can communicate to the operator the locomotive is to reduce speed in the next segment of track. Alternatively, if the signal location includes a yellow signal indicator, flashing yellow signal indicator, or green signal indicator, the virtual approach signal indicator can include a green signal indicator. The green signal indicator can communicate to the operator the locomotive can travel at full speed in the next segment of track. In another example, the segment of track can include a plurality of virtual approach signals. For example, the segment of track can include as many virtual approach signals applicable for safety requirements.

In another example, the segment of track can include the virtual approach signal indicator at a particular location along the segment of track. The particular location can correspond to global positioning system (GPS) data, geographic information system (GIS) data, latitude-longitude data, milepost data, or any other type of geolocation data relevant to the virtual approach signal indicator.

In another example, the first locomotive approach type is a reduced-speed indicator. In another example, the virtual approach signal indicator corresponds to a mapping file. The mapping file can associate the at least one virtual approach signal indicators to a position along the segment of track. The mapping file can interface a PTC onboard terminal with the CTC system to display information corresponding to the virtual approach signal indicators. For example, the mapping file can include location information about the virtual approach signal indicators such that the PTC onboard terminal can identify a location of the virtual approach signal indicators relative to the locomotive along the segment of track. In another example, the mapping file can include information regarding a number of virtual approach signal indicators along the segment of track. The mapping file can adapt the number of virtual approach signal indicators depending on a use of the segment of track. For example, the mapping file can include information to increase a frequency of locomotives along the segment of track when the locomotives are transporting cargo. The control logic 900 then proceeds to step 912.

At step 910, in an embodiment, the control logic 900 can generate the at least one virtual approach signal indicator including a second locomotive approach type. For example, the second locomotive approach type is a full-speed indicator. In an example, the full-speed indicator can correspond to a maximum sustainable velocity of the locomotive within any regulatory limits. In another example, the virtual approach signal indicator corresponds to a mapping file. For example, the second locomotive approach type is an open track indicator. The control logic 900 then proceeds to step 912.

At step 912, in an embodiment, the control logic 900 can receive an updated PTC advancement signal corresponding to a railway event. For example, the railway event can include a broken rail, an occupied track, an unoccupied track, or a hand throw switch. The updated PTC advancement signal can include information indicating whether the railway event is present in the segment of track. For example, the railway event can occur along the segment of track triggering the physical signaling component to generate a caution signal and transmit to a CTC system. In response, the CTC system can transmit the updated PTC advancement signal to the locomotive. The control logic 900 then proceeds to step 914.

At step 914, in an embodiment, the control logic 900 can update the at least one virtual approach signal indicator in response to receiving the updated PTC advancement signal. For example, the control logic 900 can receive the updated PTC advancement signal using the wireless communication hardware of the locomotive. In response to receiving the updated PTC advancement signal, the control logic 900 can update the display of the PTC onboard terminal to indicate positions and statuses of the virtual approach signal indicators relative to the locomotive. The control logic 900 then proceeds to step 916.

At step 916, in an embodiment, the control logic 900 can determine a signal change. For example, the control logic 900 can parse the updated PTC advancement signal for digital formatted machine-readable information to determine whether the advancement indicator changed from one state to another. In an example, a railway event can result in the CTC system updating the PTC advancement signal from the first advancement indicator to the second advancement indicator when the railway event causes an obstruction on the segment of track. If the signal change is from the first indicator to the second indicator, the control logic 900 then proceeds to step 918. If the signal change is from the second indicator to the first indicator, the control logic 900 then proceeds to step 920.

At step 918, in an embodiment, the control logic 900 can upgrade the at least one virtual approach signal indicator from the first locomotive approach type to the second locomotive approach type. The control logic 900 then proceeds to step 922.

At step 920, in an embodiment, the control logic 900 can downgrade the at least one virtual approach signal indicator from the second locomotive approach type to the first locomotive approach type. The control logic 900 then proceeds to step 922.

At step 922, in an embodiment, the control logic 900 can locate the virtual approach signal indicator based on geolocation data. For example, the location position of the virtual approach signal indicator can correspond to GPS data, GIS data, latitude-longitude data, milepost data, or any other type of geolocation data relevant to the virtual approach signals.

The present disclosure achieves at least the following advantages:

1. Segmenting physical blocks of railway using virtual approach signals allowing for enhanced railway utilization including increased locomotive capacity and velocity.
2. Providing virtual approach signals along a segment of track between physical signaling components for modular signal updating.
3. Increasing a capacity of locomotives allowed along the segment of track in addition to a velocity with which the locomotives can travel.
4. Providing a system agnostic to current operational protocols allowing any locomotive to segment a physical block of railway using virtual approach signals.
5. Enhancing safety of operators, crew, and passengers by providing updated signaling according to current statuses of the segment of track.
6. Reducing costs to a railway organization by optimizing use of the segment of track and minimizing time spent idle for the locomotive.

Persons skilled in the art will readily understand that advantages and objectives described above would not be possible without the particular combination of computer hardware and other structural components and mechanisms assembled in this inventive system and described herein. Additionally, the algorithms, methods, and processes disclosed herein improve and transform any general-purpose computer or processor disclosed in this specification and drawings into a special purpose computer programmed to perform the disclosed algorithms, methods, and processes to achieve the aforementioned functionality, advantages, and objectives. It will be further understood that a variety of programming tools, known to persons skilled in the art, are available for generating and implementing the features and operations described in the foregoing. Moreover, the particular choice of programming tool(s) may be governed by the specific objectives and constraints placed on the implementation selected for realizing the concepts set forth herein and in the appended claims.

The description in this patent document should not be read as implying that any particular element, step, or function can be an essential or critical element that must be included in the claim scope. Also, none of the claims can be intended to invoke 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," "processing device," or "controller" within a claim can be understood and intended to refer to structures known to those skilled in the relevant art, as further modified or enhanced by the features of the claims themselves, and can be not intended to invoke 35 U.S.C. § 112(f). For example, the terms "processor" and "controller" can be a class of structures, rather than one specific structure, and may be defined with functional terms, but that does not make it means-plus-function. Even under the broadest reasonable interpretation, in light of this paragraph of this specification, the claims are not intended to invoke 35 U.S.C. § 112(f) absent the specific language described above.

The disclosure may be embodied in other specific forms without departing from the spirit or essential characteristics thereof. For example, each of the new structures described herein, may be modified to suit particular local variations or requirements while retaining their basic configurations or structural relationships with each other or while performing the same or similar functions described herein. The present embodiments are therefore to be considered in all respects as illustrative and not restrictive. Accordingly, the scope of the disclosure can be established by the appended claims rather than by the foregoing description. All changes which come within the meaning and range of equivalency of the claims are therefore intended to be embraced therein. Further, the individual elements of the claims are not well-understood, routine, or conventional. Instead, the claims are directed to the unconventional inventive concept described in the specification.

What is claimed is:

1. A method for providing virtual approach signaling between physical signaling components, comprising:
   receiving a positive train control (PTC) advancement signal corresponding to a signal location;
   splitting a segment of railroad track into two or more sections using at least one virtual approach signal indicator;
   displaying the at least one virtual approach signal indicator on a PTC locomotive onboard display, the at least one virtual approach signal indicator being displayed on the PTC locomotive onboard display at a location that corresponds to a location along the segment of railroad track that is devoid of any physical signaling component;
   determining whether the PTC advancement signal indicates a first advancement indicator or a second advancement indicator;
   generating the at least one virtual approach signal indicator including a first locomotive approach type, when the PTC advancement signal indicates the first advancement indicator;
   generating the at least one virtual approach signal indicator including a second locomotive approach type, when the PTC advancement signal indicates the second advancement indicator;
   receiving an updated PTC advancement signal corresponding to a railway event of the signal location, wherein the railway event includes a broken rail, an occupied track, an unoccupied track, or a hand-throw switch; and
   updating the at least one virtual approach signal indicator in response to receiving the updated PTC advancement signal;
   wherein a visual appearance of the at least one virtual approach signal indicator is actively controlled in real time based on the updated PTC advancement signal, the visual appearance indicating various statuses of a next segment of track.

2. The method of claim 1, wherein the first advancement indicator includes a red signal indicator or a flashing red signal indicator.

3. The method of claim 1, wherein the second advancement indicator includes a yellow signal indicator, a flashing yellow signal indicator, or a green signal indicator.

4. The method of claim 1, wherein the first locomotive approach type includes a reduced-speed indicator.

5. The method of claim 1, wherein the second locomotive approach type includes an open track indicator.

6. The method of claim 1, further comprising upgrading the at least one virtual approach signal indicator from the first locomotive approach type to the second locomotive approach type when the PTC advancement signal changes from the first advancement indicator to the second advancement indicator.

7. The method of claim 1, further comprising downgrading the at least one virtual approach signal indicator from the second locomotive approach type to the first locomotive approach type when the PTC advancement signal changes from the second advancement indicator to the first advancement indicator.

8. The method of claim 1, wherein the at least one virtual approach signal indicator corresponds to a mapping file.

9. The method of claim 1, further comprising locating the virtual approach signal between the physical signaling components based on geolocation data.

10. A wayside system for providing virtual approach signaling between physical signaling components, comprising:
   a positive train control (PTC) onboard computer; and
   a processor configured to perform the steps of:
      receiving a PTC advancement signal corresponding to a signal location;
      splitting a segment of railroad track into two or more sections using at least one virtual approach signal indicator;

displaying the at least one virtual approach signal indicator on a PTC locomotive onboard display, the at least one virtual approach signal indicator being displayed on the PTC locomotive onboard display at a location that corresponds to a location along the segment of railroad track that is devoid of any physical signaling component;

determining whether the PTC advancement signal indicates a first advancement indicator or a second advancement indicator;

generating the at least one virtual approach signal indicator including a first locomotive approach type, when the PTC advancement signal indicates the first advancement indicator;

generating the at least one virtual approach signal indicator including a second locomotive approach type, when the PTC advancement signal indicates the second advancement indicator;

receiving an updated PTC advancement signal corresponding to a railway event of the signal location, wherein the railway event includes a broken rail, an occupied track, an unoccupied track, or a hand-throw switch; and updating the at least one virtual approach signal indicator in response to receiving the updated PTC advancement signal;

wherein a visual appearance of the at least one virtual approach signal indicator is actively controlled in real time based on the updated PTC advancement signal, the visual appearance indicating various statuses of a next segment of track.

11. The system of claim 10, wherein the first advancement indicator includes a red signal indicator or a flashing red signal indicator.

12. The system of claim 10, wherein the second advancement indicator includes a yellow signal indicator, a flashing yellow signal indicator, or a green signal indicator.

13. The system of claim 10, wherein the first locomotive approach type includes a reduced-speed indicator.

14. The system of claim 10, wherein the second locomotive approach type includes an open track indicator.

15. The system of claim 10, wherein the processor is further configured to perform the step of upgrading the at least one virtual approach signal indicator from the first locomotive approach type to the second locomotive approach type when the PTC advancement signal changes from the first advancement indicator to the second advancement indicator.

16. The system of claim 10, wherein the processor is further configured to perform the step of downgrading the at least one virtual approach signal indicator from the second locomotive approach type to the first locomotive approach type when the PTC advancement signal changes from the second advancement indicator to the first advancement indicator.

17. The system of claim 10, wherein the virtual approach signal indicator corresponds to a mapping file.

18. The system of claim 10, further configured to locate the virtual approach signal indicator between the physical signaling components based on geolocation data.

19. A computer-implemented method for providing virtual approach signaling between physical signaling components, the computer-implemented method comprising:

receiving a positive train control (PTC) advancement signal corresponding to a signal location;

splitting a segment of railroad track into two or more sections using at least one virtual approach signal indicator;

displaying the at least one virtual approach signal indicator on a PTC locomotive onboard display, the at least one virtual approach signal indicator being displayed on the PTC locomotive onboard display at a location that corresponds to a location along the segment of railroad track that is devoid of any physical signaling component;

determining whether the PTC advancement signal indicates a first advancement indicator or a second advancement indicator;

generating the at least one virtual approach signal indicator including a first locomotive approach type, when the PTC advancement signal indicates the first advancement indicator;

generating the at least one virtual approach signal indicator including a second locomotive approach type, when the PTC advancement signal indicates the second advancement indicator;

receiving an updated PTC advancement signal corresponding to a railway event of the signal location, wherein the railway event includes a broken rail, an occupied track, an unoccupied track, or a hand-throw switch; and updating the at least one virtual approach signal indicator in response to receiving the updated PTC advancement signal;

wherein a visual appearance of the at least one virtual approach signal indicator is actively controlled in real time based on the updated PTC advancement signal, the visual appearance indicating various statuses of a next segment of track.

20. The computer-implemented method of claim 19, wherein the first advancement indicator includes a red signal indicator or a flashing red signal indicator.

21. The computer-implemented method of claim 19, wherein the second advancement indicator includes a yellow signal indicator, a flashing yellow signal indicator, or a green signal indicator.

22. The computer-implemented method of claim 19, wherein the first locomotive approach type includes a reduced-speed indicator.

23. The computer-implemented method of claim 19, wherein the second locomotive approach type includes a full-speed indicator.

24. The computer-implemented method of claim 19, further comprising upgrading the at least one virtual approach signal indicator from the first locomotive approach type to the second locomotive approach type when the PTC advancement signal changes from the first advancement indicator to the second advancement indicator.

25. The computer-implemented method of claim 19, further comprising downgrading the at least one virtual approach signal indicator from the second locomotive approach type to the first locomotive approach type when the PTC advancement signal changes from the second advancement indicator to the first advancement indicator.

26. The computer-implemented method of claim 19, wherein the virtual approach signal indicator corresponds to a mapping file.

27. The computer-implemented method of claim 19, further comprising locating the virtual approach signal indicator between the physical signaling components based on geolocation data.

* * * * *